United States Patent
Walker et al.

(10) Patent No.: US 10,044,696 B2
(45) Date of Patent: *Aug. 7, 2018

(54) SIMPLIFIED SENSOR INTEGRITY

(71) Applicant: McAfee, LLC, Plano, TX (US)

(72) Inventors: Jesse Randall Walker, Portland, OR (US); Howard C. Herbert, Gilbert, AZ (US); Kirk D. Brannock, Gaston, OR (US); Stephen H. Price, Gilbert, AZ (US); Geoffrey H. Cooper, Palo Alto, CA (US); David A. deVries, Ottawa (CA); David M. Amols, Mesa, AZ (US); Sven Schrecker, San Marcos, CA (US)

(73) Assignee: McAfee, LLC, Plano, TX (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/978,920

(22) Filed: Dec. 22, 2015

(65) Prior Publication Data

US 2017/0180341 A1      Jun. 22, 2017

(51) Int. Cl.
*H04L 29/06*      (2006.01)
*H04L 9/32*       (2006.01)
*G06F 8/61*       (2018.01)

(52) U.S. Cl.
CPC .............. *H04L 63/08* (2013.01); *G06F 8/63* (2013.01); *H04L 9/3236* (2013.01)

(58) Field of Classification Search
CPC ........................................... H04L 63/08
USPC .............................................. 726/3
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,437,568 B2 * | 10/2008 | Das-Purkayastha | G06F 21/552 380/277 |
| 7,506,155 B1 | 3/2009 | Stewart et al. | |
| 7,805,375 B2 * | 9/2010 | Fox | G06F 21/10 705/56 |
| 9,170,625 B1 * | 10/2015 | Gettings | G05B 15/02 |
| 2006/0288202 A1 * | 12/2006 | Doran | G06F 9/4416 713/2 |
| 2008/0222430 A1 | 9/2008 | Buscaglia et al. | |
| 2010/0268949 A1 | 10/2010 | Schuetze | |
| 2011/0103583 A1 | 5/2011 | Yoon et al. | |
| 2015/0350255 A1 | 12/2015 | Robinson et al. | |

FOREIGN PATENT DOCUMENTS

WO      2014175721 A1      10/2014

OTHER PUBLICATIONS

International Search Report and Written Opinion issued in PCT Application No. PCT/US2016/062375 dated Feb. 16, 2017; 12 pages.

* cited by examiner

*Primary Examiner* — Longbit Chai
(74) *Attorney, Agent, or Firm* — Patent Capital Group

(57) ABSTRACT

An apparatus is provided that includes at least one processor device, an energy storage module to power the apparatus, memory to store a secret such that powering down and restarting the apparatus causes the secret to be lost, logic executable by the at least one processor device to generate attestation data using the secret that data abstracts the secret, and a communications interface to send the attestation data to another device.

15 Claims, 10 Drawing Sheets

SIMPLIFIED SENSOR INTEGRITY

TECHNICAL FIELD

This disclosure relates in general to the field of computer security and, more particularly, to securing portable computing devices.

BACKGROUND

The Internet has enabled interconnection of different computer networks all over the world. The ability to effectively protect and maintain stable computers and systems, however, presents a significant obstacle for component manufacturers, system designers, and network operators. Indeed, each day thousands of new threats, vulnerabilities, and malware are identified that have the potential of damaging and compromising the security of computer systems throughout the world. Computer-implemented security can also be applied to non-computing goods and entities. For instance, surveillance cameras, radio frequency identification (RFID) tags, and temperature sensors have been used to identify threats, security breaches, and other issues affecting the entities. In some cases, malicious actors attempt to circumvent security measures provided to protect goods and entities by compromising the sensors used to detect such events.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
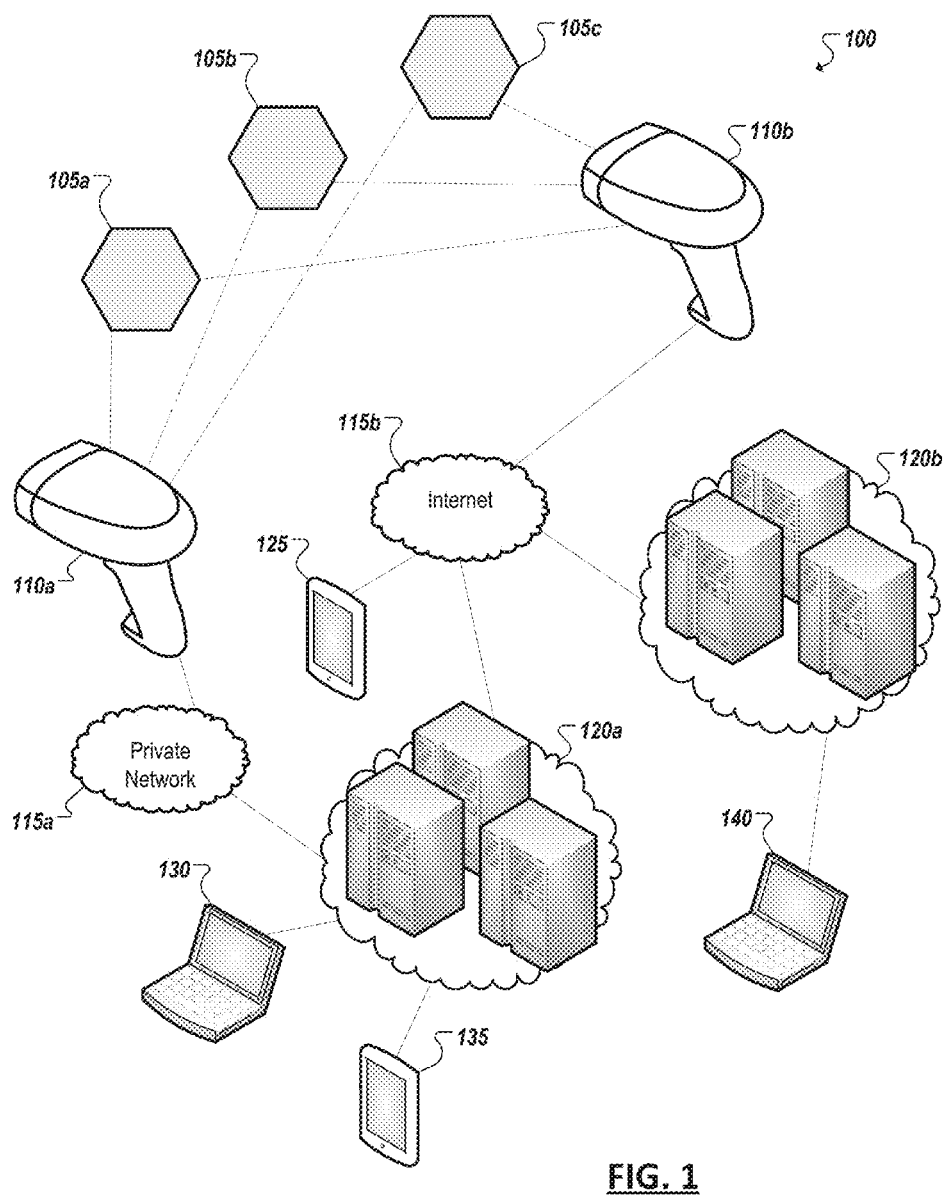
FIG. 1 is a simplified schematic diagram of an example system including an one or more attestation devices, one or more gateway devices, and a management system in accordance with one embodiment.

FIG. 1 is a simplified block diagram illustrating an example embodiment of a computing environment 100 including one or more example hardware-based attestation devices 105*a-c*. The attestation devices 105*a-c* can be implemented as sensor devices that can sense characteristics of their respective surroundings, and log their findings in memory. The integrity of the readings can be verified through the attestation features of the devices 105*a-c*. The devices 105*a-c* can be used, for instance, as in-package sensors to sense conditions of a package during delivery, as user authentication devices in connection with an admission ticket, a medical sensor implanted or otherwise attached to a human or animal, as a sensor for inclusion in a vehicle to assess attributes of the vehicle, as a tracking device to monitor a product as it progresses through a manufacturing process, among other example uses. The devices 105*a-c* can be simplified devices and, in some cases, be small in dimension. Simplifying the processing and memory capacity of the devices can allow the devices to be mass-produced and distributed as low cost sensing and/or integrity attestation solutions throughout a number of applications without fear of the devices' potential loss or damage resulting in the loss of substantial capital.

Gateway devices (e.g., 110*a-b*) can be provided that are capable of communicating with the devices 105*a-c*, for instance, using near field communications (NFC) or other short range wireless communications technologies. The gateway 110*a-b* can send a signal to a device (e.g., 105*a-c*) within proximity of the gateway to cause the device to transmit a signal or message to the gateway 110*a-b* in response. A portion of the data transmitted by the device 105*a-c* can be signed, encrypted, secured, or generated using a securely-stored secret stored in a segment of memory of the device. The portion of the data can serve as attestation data, which a backend system (e.g., 120*a-b*) can assess to verify that the integrity of the device (and, thereby, any information logged by the device) has not be compromised. The segment of the device memory holding the secret can be volatile or otherwise configured to cause the secret to be deleted, lost, or replaced any time the device is powered down and/or restarted. For instance, as malicious reprogramming of the device can require the device's power to be brought down and then the device to restart, such malicious activities can cause the secret to be lost, thus making it impossible for the device attest to its integrity the next time a gateway device 110*a-b*, such as a scanner gun, wand, smartphone, or other device, communicates with and receives data from the device (e.g., 105*a-c*). In such implementations, integrity of the device can be conditioned on it having not lost power and being restarted since being initialized with the original secret, among other example implementations.

Gateway devices (e.g., 110*a-c*) can communicate with backend systems using one or more networks (e.g., 115*a-b*) including private (e.g., 115*a*) and public networks (e.g., 115*b*). The gateways devices themselves may possess relatively little logic and storage for storing and assessing data delivered by a device 105*a-c*. In some cases, the gateway devices 110*a-c* can simply forward data received from a device (e.g., 105*a-c*) over a network (e.g., 115*a-b*) to a backend logging system (e.g., 120*a-b*). In some implementations, the gateway devices can, themselves, include attestation data with the data received from the scanned device (e.g., 105*a-c*) to attest to the gateway's identity. For instance, a gateway can be associated or paired with a particular entity and attestation data for the gateway can attest to the gateway being under the control of the particular entity. For example, in shipping or delivery applications, where the sensor devices (e.g., 105*a-c*) are included in the shipped package, a gateway can scan the package and send gateway attestation data (with data received from the sensor device) to indicate that the particular package is entering, still in, or leaving the custody of the particular entity, among other examples.

In some implementations, gateway devices (e.g., 110a-b) can be provided with additional functionality and/or be paired with other devices to enhance the functionality of the gateway devices. For instance, a graphical user interface (GUI) can be provided through which a user can cause the gateway device to perform one or more of the functions above (e.g., scan a box or tag including an attestation device, etc.). Graphical user interfaces can also be provided to allow a user to view at least some of the information collected by the gateway device. For instance, a GUI (on the gateway device or another user device) can be provided that allows a user to inspect the results of an attestation of an attestation device (e.g., whether the originally provisioned secret is found to still be present on the attestation device). Other information can be viewed as well, such as information (e.g., sensor readings) in log data collected by a sensor attestation device and reported to the gateway device (e.g., 110a-b) and/or management system (e.g., 120a-b). Thus, as an item attached to or containing an attestation device is scanned by a gateway device, users of the gateway device, users associated with an entity corresponding to the gateway device, or users associated with the attestation device (e.g., a customer tracking a package or other item attached to, wearing, or containing the attestation device during shipment) can view presentations of information associated with log and attestation data collected from the attestation device to assess the continued integrity, safety, and status of the attestation device (and items associated with the attestation device (e.g., 105a-c).

Additional computing devices (e.g., 125, 130, 135, 140) can also be provided in environment 100. For instance, user computing devices can be provided to interface with and administer a backend logging, assessment, or other management system (e.g., 120a-b). User computing devices, as well as other computing systems can interface with management systems (e.g., 120a-b), using one or more networks 115a-b. As noted above, user computing devices can also be used to provide GUIs to allow users to view graphical presentations of information relating to continuing attestations and log data collected from attestation devices (e.g., 105a-c) by various gateway devices. User devices can access data to support such GUI presentations from management systems (e.g., 120a-b) and/or gateway devices (e.g., 110ab) over one or more networks (e.g., 115a-b). In some implementations, user computing devices can be general purpose computing devices provided with software and/or peripherals allowing the user device (e.g., a smartphone or tablet) to function as a gateway device, among other examples. Networks 115a-b, in some implementations, can include local and wide area networks, wireless and wired networks, public and private networks, and any other communication network enabling communication between the systems.

In general, "servers," "devices," "computing devices," "host devices," "user devices," "clients," "servers," "computers," "systems," etc. (e.g., 105a-c, 110a-b, 120a-b, 125, 130, 135, 140, etc.) can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system (OS), including Linux, Real-time OS, UNIX, Windows Server, etc., as well as virtual machines adapted to virtualize execution of a particular operating system, including customized and proprietary operating systems.

Host and user devices (e.g., 110a-b, 120a-b, 125, 130, 135, 140), including some implementations of gateway devices, can further include computing devices implemented as one or more local and/or remote client or end user devices, such as personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

The feature sets of modern computers are expanding rapidly, with more and more sensors, memory, processing power, and user interface area being crammed into smaller and smaller devices. Such developments allow users and organizations to have access to powerful general purpose devices capable of being used in a variety of ways. However, with such robust feature sets, often comes cost. As a result, multi-feature general purpose computing devices and similar higher-power computing elements can be limited in their deployment. One example includes the computer-monitoring of shipping packages and containers. Given the nature of shipping, with possession of the package changing hands (sometimes multiple times during a shipment), computing hardware used to make the shipping container "smart" can be especially prone to loss. Additionally, the value of the payload of a package may not justify the use of a high-powered computer sensor device, with the potential loss of the sensor device being of greater value than the contents of the package itself. Thus, widespread deployment of smart packaging, using conventional devices may be limited.

Continuing with the example of shipping, as well as other use cases where small, simplified processors are used to enhance a product or make it "smart," it can be desirable to add a layer of security to the product. For instance, in some cases, making a product "smart" can introduce new vulnerabilities and threats that hitherto did not exist when the product was "dumb." Other use cases, by their nature, represent sought after targets for malicious actors. For instance, an electronic payment instrument may represent a target to a malicious actor. In the example of a shipping container with monitors or sensors used to verify the contents of the container (and indicate when the contents are incorrect, missing, or intact), malicious actors may desire to intercept such a package and compromise the computing devices used to provide such verification, such that the actors can steal or replace valuable contents within the package and change a digital manifest such that the stolen goods are not missed at the delivery end point. In still another example, in-package sensors can be used to indicate conditions of the package while it is in transit and log events that indicate the package has been mishandled. Parties responsible for the mishandling of the package would have an incentive to compromise the sensor's log to obfuscate that they were the party responsible for damage that potentially occurred through the mishandling, among other example issues.

For simplified, low cost, and in some cases, even disposable sensor or identity devices, providing security can be problematic. Often, a simplified computing device will lack the memory and processing power to support traditional software-based security solutions, including intrusion prevention, sophisticated encryption, and other higher touch security tools. Additionally, sophisticated hardware-based security tools such as hardware based random number generators, trusted execution environments, dedicated security processors, etc., can cause the costs and complexity of a device to quickly increase, in some cases, defeating the desired simplicity of the device's overall design. Accordingly, a simplified security solution can be desired that is in keeping with the overall simplicity and affordability of the overall device design, among other example considerations.

Figure 2:
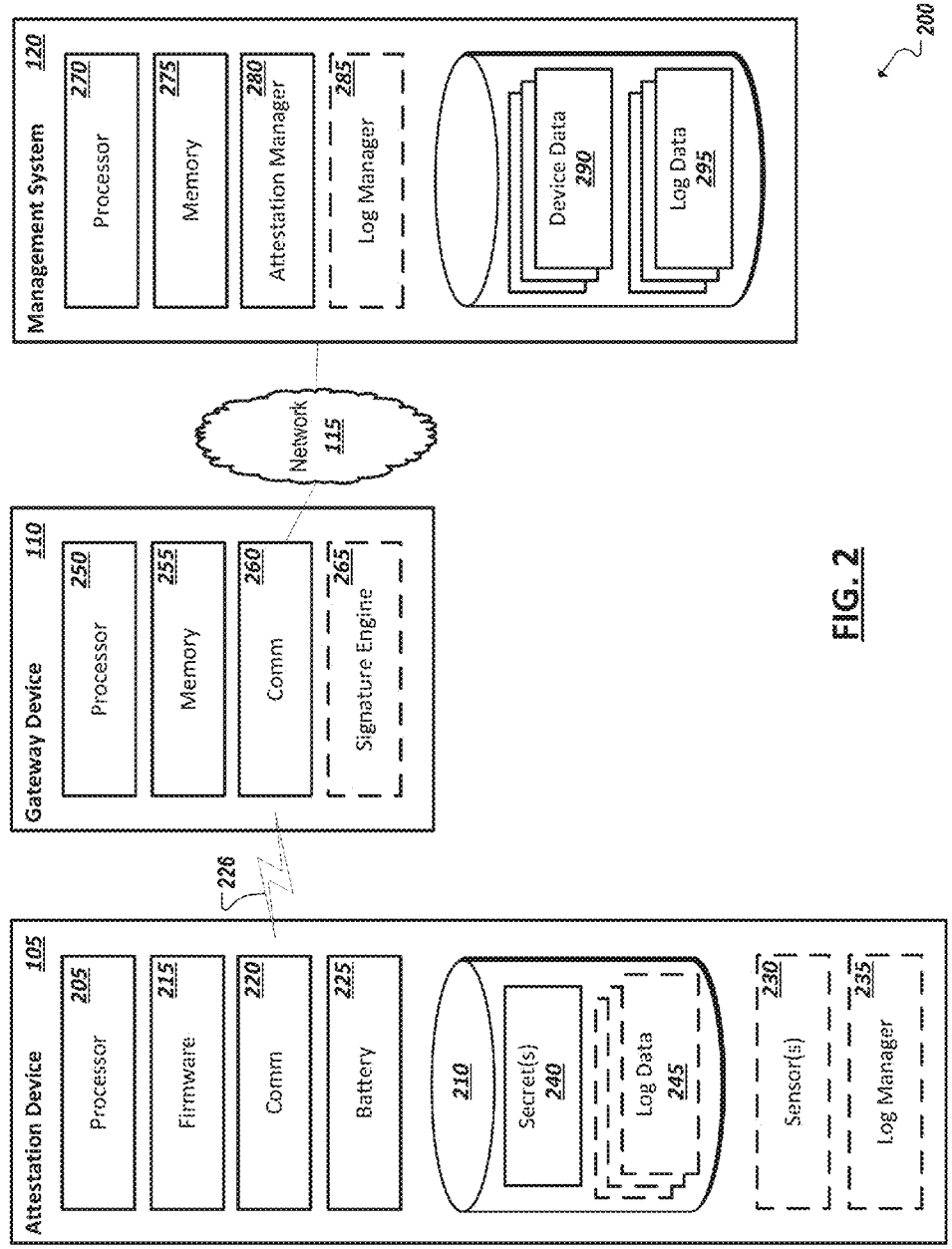
FIG. 2 is a simplified block diagram of an example system including an example attestation device, an example gateway device, and an example management system in accordance with one embodiment.

An improved sensor device, gateway, and supporting backend management system can be provided, such as illustrated and described herein, that can address one or more of the issues introduced above, among other example advantages. For instance, as shown in the example of FIG. 2, a simplified block diagram 200 is shown illustrating a system or computing environment that includes, for instance, an example implementation of a simplified attestation device 105 capable of attesting to the integrity of data collected or stored by the device. The system can further include one or more gateway devices (e.g., 110), which can connect to a backend management system 120 over one or more networks (e.g., 115).

In one example, a simplified attestation device 105 can include a processor apparatus 205, one or more memory elements (e.g., 210), and firmware 215 embodying logic, executable by the processor 205, to provide functionality of the attestation device 105, including communications (e.g., using wireless communication module 220) with one or more gateway devices (e.g., 110), for instance, over a wireless connection 226, management of and access to secret data (e.g., 240), and generation of attestation data from the secret data 240. In some implementation, a simplified attestation device 105 can further include functionality to sense environmental conditions in proximity to the device 105 and record these conditions in log data (e.g., 245). In such implementations, a set of one or more sensors 230 can be provided, such as thermistors (or other temperature sensors), gyroscopes, accelerometers, humidity sensors, radiation sensors, light sensors, among other examples. A log manager 235 can also be provided to generate log data 245 based on the signals generated by sensors 230 in response to various events and conditions. For instance, log manager 235 can generate log data according to a defined reporting period, as readings are generated by various sensors 230, in response to defined events (e.g., a sensor reading falling above or below a particular threshold), in response to a gateway device communication, among other examples.

As noted above, an attestation device 105 can include memory 210, at least a portion of which is configured to erase or lose the secret data 240 stored therein if power is lost in the device. For instance, if the device is powered down and restarted to complete the installation or provisioning of new or updated firmware (e.g., malware), the secret(s) 240 stored in this portion of memory will be lost. Loss or expiration of the battery 225 can also cause a powered-down condition. Indeed, the battery 225 can be provided to facilitate or correspond to a desired device- or session-life for the device. For instance, a battery 225 can be selected to accommodate a maximum anticipated length of a shipping route, expiration of an event (e.g., sporting event, concert, conference, etc.) for which a ticket, entrance pass, or other credential is provisioned with the attestation device, among other examples. The inevitable expiration of the secret data (e.g., by virtue of the device 105 being at some point powered down) can serve to limit the lifespan of the secret data. If the attestation device 105, using firmware 215, is able to generate (from the secret 240) attestation data recognized as expected and authentic for the device 105 (e.g., based on a known and trusted provisioning event where the secret 240 was assigned), it can be assumed that the limited functionality (e.g., as defined in firmware) has not been tampered with. Accordingly, attestation can be conditioned on the device 105 having remained "on" since the trusted provisioning event.

In some cases, a single secret can be stored as secret data 240. After the secret data's expiration, another trusted provisioning event can load new secret data 240 into the designated segment of memory. This segment of memory can be separate from other segments of memory and can have characteristics of volatile memory. Indeed, in one example, the segment can be a segment of static random access memory (RAM) (e.g., 210) designed to drain on a power down event. In some implementations, the attestation device can be configured with a power-up code that causes the secret to be erased (if it somehow does survive the power down event. Other segments can be non-volatile (e.g., implemented as flash memory) and can be used to store data (e.g., at least some log data) that is desired to survive a power down of the device 105. For instance, another segment of memory 210 can be used to store a user identifier associated with an assigned users (e.g., in instances where the attestation device is to be used as a temporary identifier or user authentication device (e.g., a limited use credential, such as an admission ticket). In implementations where the attestation device 105 also possesses environment sensing functionality (e.g., through sensors 230), log data 245 generated to describe the sensor readings and events can be stored in another segment of the memory 245 that is to survive a power down event, among other example implementations.

Gateway devices (e.g., 110) can be any device that includes communications capabilities (e.g., through communications module) to prompt an attestation device (e.g., 105) to send the gateway 110 attestation data and, potentially also, log or identifier data. Gateway devices can further include communications functionality for connecting, over one or more networks 115, to a backend management system (e.g., 120) and forward at least a portion of data received from the attestation device 105 to the management system 120. Gateway devices 110 can be a dedicated gateway device, such as a scanning gun, scanning gun, or other device specifically designed to scan various devices including attestation devices (e.g., 105). In other implementations, the gateway device can be or include a general purpose computing device (e.g., a tablet, smartphone, or other handheld mobile computer) outfitted with communications capabilities allowing the general purpose computing device to interact with the attestation device, among other examples. In the example implementation illustrated in FIG. 2, a gateway device 110, can include one or more processor devices 250, one or more memory elements 255, one or more communications modules 260 facilitating communication with both attestation devices and one or more backend management services (e.g., 120). Further, in some instances, a gateway device can optionally include a signature engine 265 comprising logic to derive a signature for corresponding to the gateway device for use in authenticating the gateway device 110 to backend services and potentially also some implementations of attestation devices. In one example, a gateway device 110 can receive data from the attestation device and package the data for forwarding to the management system 120. In some implementations, authentication logic, such as signature engine 265, can be used by a gateway device 110 to indicate handoffs, transitions, or changes of custody of an entity (e.g., a package, a human user, livestock, etc.) associated with a given attestation device, among other examples.

A backend management system 120 can be implemented, for instance, as an enterprise server or cloud-based service for testing the attestation data and/or storing and assessing log and other data forwarded from the attestation device by a gateway. In one example, a management system 120 can include one or more data processor devices 270, one or more memory elements 275, and various components implemented in software- and/or hardware-based logic. Such components can include, for instance, an attestation manager 280. An attestation manager 280 can manage a data structure tracking attributes and configurations of multiple different attestation devices. Accordingly, device data 290 can be maintained by the management system 120 and describe, for each attestation device 105 managed by the management system 120, the secret(s) 240 currently used by the device 105, the specific firmware 215 (e.g., type, version, etc.) used by each attestation device to generate attestation data from its secret(s), and other information identifying the device 105 and its use. The attestation manager, in one example, can receive attestation data forwarded to it as collected from an attestation device 105, generate the attestation data expected from the particular attestation device, and compare the received attestation data against the generated expected attestation data.

In some implementations, a management system 120 interacting with attestation devices 105 equipped with sensors 230 and generating log data 245 from the sensor readings can additionally include a log manager 285 and store log data 295 received from the attestation device via a gateway device 110. Log data 295 can be tied to the device data 290 to associate information in the log data with the device data. In some cases, attestation data can be embedded in log data received at the management system 120. Further, the log data can be encrypted using the secret or other logic at the attestation device, such that it is only viewable, in the clear, by the management system.

An attestation manager 280 of an example management system 120 can also receive authentication data corresponding to a gateway device 110, such as a signature, and authenticate the gateway device 110 based on the received authentication data. In cases where the attestation device is a sensor attestation device and produces log data 245 to share with management system 120, the attestation device can sign the log data 245 to allow the log data 245 to be verified by the management system 120 irrespective of the trustworthiness of the intermediary gateway device over which the log data is passed to the management system 120. In some implementations, messages from a gateway can be authenticated by virtue of the presence of authentic attestation data. As a result, unsecured or unauthenticated gateway devices can be used, in some implementations.

The attestation manager 280 can further operate (e.g., conjunction with a log manager 285) to interpret authentication data and other log identifier data provided by a gateway device to identify when different gateways and potentially different entities have scanned an attestation device. In some instances, log data, attestation data, and/or gateway authentication data sent by two different gateway devices, relating to a particular attestation device and sent within a particular time period, can be interpreted as a handoff of responsibility or custody of the attestation device and any entity associated with the attestation device.

The log manager 285 of the management system 120 can manage log data 295 collected from one or more sensor attestation devices. In some cases, the log manager 285 can include data analytics tools and logic to process the log data to identify particular events, alerts, trends, or patterns based on the received log data. In some instances, the management system 120 can serve or otherwise make the log data 295 available to other applications and services for analysis of the log data in lieu of or in addition to any analytics performed at the management system 120 itself, among other examples.

The management system 120 can be responsible for configuring or initializing at least a subset of a collection of attestation devices 105. The management system 120 (e.g., using attestation manager 280) can identify a particular attestation device (e.g., 105) and identify the firmware (or other logic) expected to reside on the device 105. The management system 120 can assign one or more secrets and cause these secrets to be written in a segment of the attestation device's memory that is to be flushed should the attestation device ever lose power. In some cases, the firmware 215 of the attestation device can be configured to generate attestation data from two or more secrets 240. For instance, in one example, the attestation device firmware can take a secret value and hash it with a random number generated from a secret seed (also provisioned on the device 105 during configuration) and potentially other values to generate attestation data. This particular implementation can allow for different, but predictable (to the management system), attestation data to be generated each time the attestation device 105 is queried (e.g., by a gateway) for attestation data, making it difficult to spoof the attestation data based on observing previous attestation data form the device 105. Accordingly, based on the firmware employed and corresponding attestation data generation algorithms used, the management system 120 can generate or assign corresponding secrets. Further, by knowing not only the secrets that are on the attestation device, but also the firmware that the attestation device will use in generating attestation data, the management system 120 can emulate generation of the attestation data (e.g., using attestation manager) to allow the management system 120 to verify the integrity and authenticity of attestation data generated by the attestation device 105 and captured by a gateway device 110.

In some implementations, a trusted gateway device (e.g., 110) can be employed during an initialization or configuration of an attestation device (e.g., 105) to allow the management system 120 to provision secret data (e.g., 240) in memory of the attestation device 105. For instance, the management system 120 can send a request to the trusted gateway device 110 identifying that a particular secret is to be provisioned on the attestation device. The gateway 110 can send a signal (e.g., over near field communication channel 226) indicating that a new secret is to be written. The gateway 110 can further send data identifying the secrets to the attestation device 105. In some implementations, the gateway 110 (and/or the management system) can send the secret in an encrypted or otherwise secured package from which the attestation device is capable of extracting the new secret(s). Securing the provisioning of secrets in the attestation device 105 can utilize and leverage physical security of the device at the time it is provisioned. Accordingly, provisioning secrets can be limited to secured physical environments. In some implementations, the attestation device 105 can further contain a hardware root of trust and a trusted execution environment, which can allow it to reliably attest remotely to the gateway 110, even outside of a secured physical environment.

Figure 3:
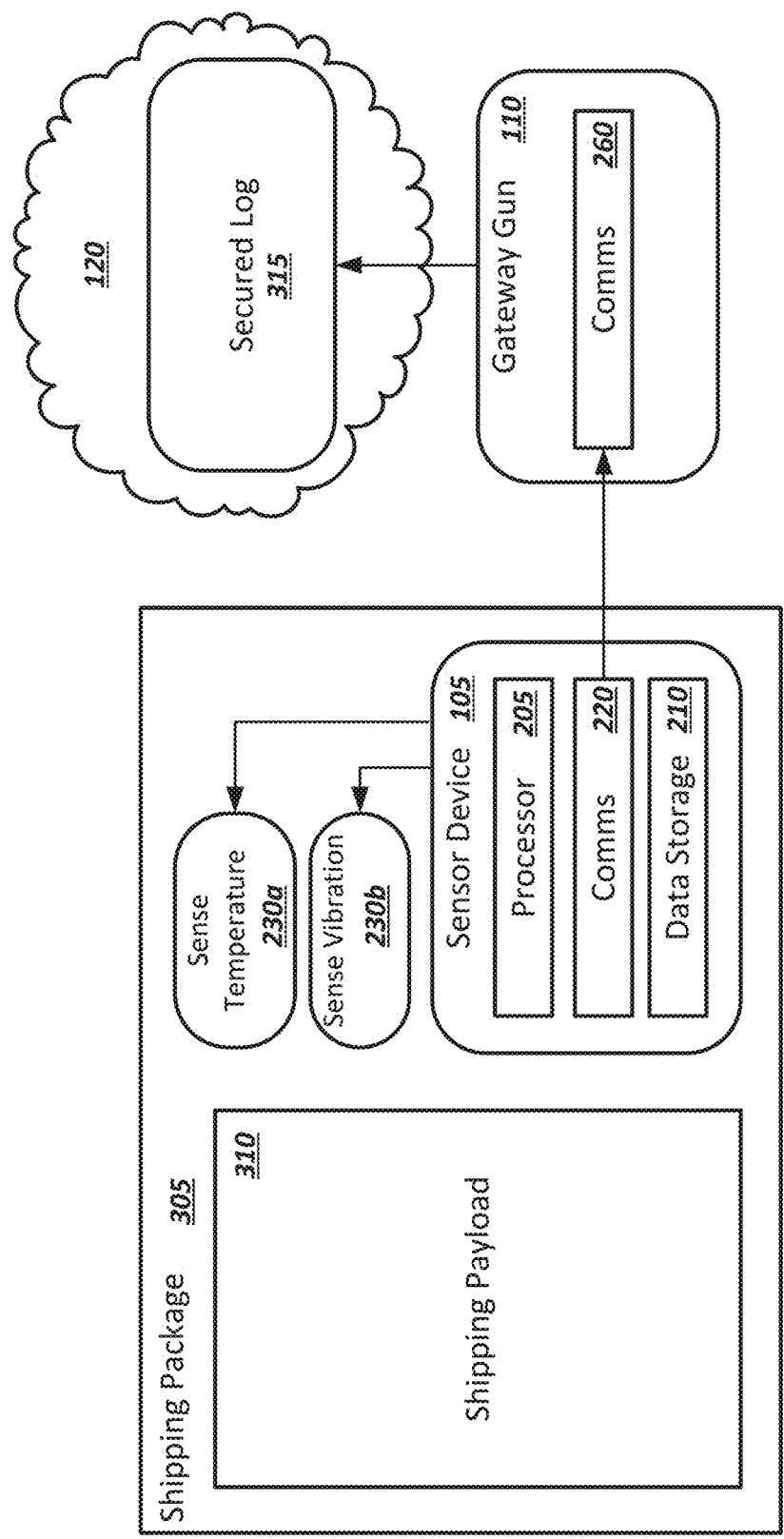
FIG. 3 is a simplified block diagram representing use of an attestation device as a package sensor in accordance with one embodiment.

Turning to FIG. 3, another simplified block diagram 300 is presented illustrating a specific implementation of an example attestation device 105 with environment sensors 230a-b. In this particular example, the attestation device is implemented as an in-package sensor device, which can be placed inside a package 305 and monitor conditions of the package, the environment within the package 305, and conditions of the shipping payload 310 within the package 305. The attestation device (also referred to herein as a sensor device) 105 can communicate with a gateway device, such as a gateway gun 110, and pass attestation data and log data (reporting the environmental monitoring) to a cloud-based management system 120 maintaining a secure log 315 for the reported data.

In one example, the sensor device 105 can sensor data and logic enabling limited cryptographic primitives, such as a crypto-hash (e.g., SHA-256). In some instances, symmetric cryptography can be supported and used if privacy of the log is desired (e.g., to keep the log data private between the sensor device and management system). Secrets maintained at the sensor device can be shared (e.g., with the management system having authority to manage secrets, etc.). At the sensor device 105, secret data, log data, and other data can be self-secured, thereby mitigating a need for secured communications. The management system's log data structure can be implemented in the cloud using simple storage primitives. In some implementations, the log data structure can be implemented to leverage existing email or logging primitives of a system, among other examples.

Sensor device integrity can be measured directly on the running platform and rely on the sensor device staying powered on. Through such simplified provisions, relatively expensive and higher-end security features, such as measured boot or trusted execution environments, can be omitted. Using such features, in the example of FIG. 3, integrity of the sensor device can be measured when the package ships and when it arrives at an exchange point or the final destination. Intermediate checks can reference the secret provisioned on the secure device during initialization to verify the continued integrity of the sensor device and its readings. All data from the sensor device can be self-verified against secrets stored in the cloud and associated with the sensor device. Indeed, in some cases, sensor data can be encrypted, at the sensor device 105, to hide its contents. By pre-securing the data (e.g., through a hash (e.g., SHA256) based on the shared secret) communication can be simplified and left unsecured.

In one particular example, the sensor device 105 can include a processor 205, such as a secure, low-power system on chip (SoC). In one example, the processor can include a Joint Test Action Group (JTAG) port. During initialization of the sensor device 105, the sensor device can be powered on (e.g., a battery can be provided with capacity sufficient to keep the sensor device powered on through the duration of a shipment) and the JTAG port enabled. The sensor can then be provisioned with a secret, S1, and a random number generation (RNG) seed, and a known firmware image via the JTAG port. In one example, memory (e.g., 210) of the sensor device can be implemented as flash memory. A segment (e.g., 8 kB) of the overall flash memory (e.g., 192 kB) can be implemented as static random-access memory (SRAM), such that the memory segment retains volatility and loses its data when unpowered. In this particular example, once the sensor device has been initialized, the sensor device can disable the JTAG, thereby disabling modification of flash memory of the sensor device (i.e., where the secrets (e.g., S1 and the RNG seed) and firmware image are stored.

The sensor device 105 can attest to its state by hashing S1, the RNG seed, and the running firmware image code and causing this hash to be transmitted to a management system, which also has knowledge of the S1, RNG seed, and firmware image and can verify the hash. Upon verifying correct initialization of the sensor device, the sensor device can be deployed. Following deployment, any change of sensor configuration (e.g., a modification of the secret or firmware image) can be detected. Power failures, software defects, alpha particles and other defaults can cause the secret data (e.g., secret S1 and the RNG seed) to be destroyed. Reconstructing the loaded configuration can be computationally infeasible due to collision resistance of the hash function used by the system.

In one example implementation, the gateway device, such as that illustrated in the example of FIG. 3, can maintain a defined identity and the identity can be associated or mapped to an entity, such as a specific user, group, organization, enterprise, etc. In one example, the gateway device can maintain a public key infrastructure (PKI) identity. Accordingly, a private key can be maintained at the gateway device 110, for instance, in secured memory, such as a trusted execution environment implemented on the gateway device. Further, a public key can also be associated with and stored at the gateway device 110. The public key can be signed by a trusted external authority and can be stored as a certificate chain. The gateway device 100, in such an example, can sign its own public key and thereby create a credential that asserts the presence of the gateway's private key without revealing it. This credential can be used to identify the gateway (e.g., to one or more management systems), as well as serve in handshakes that indicate a transfer of custody of an entity associated with a given attestation device, among other examples. The gateway's credential can also be shared with the attestation device, to allow the attestation device to log which gateway devices have interfaced with the attestation device. The attestation device can forego verifying the authenticity of the gateways and can, instead, delegate this to the management system backend 120, which can then assess secured log data received from the attestation device 105 and identifying the gateways with which the attestation device 105 has interacted. Other gateway devices can be "dumb" or lack strong identity or attestation capabilities. Such gateways, however, can also interact with attestation devices and report data from the attestation devices to management systems (although the management system's trust and use of data received from such simplified gateways may be limited (e.g., in response to not being able to verify identity or trustworthiness of the gateway from a corresponding credential, etc.)).

A gateway device (e.g., 110) can communicate with an attestation device (e.g., 105) through any short-range communication channel, including non-encrypted channels. For instance, near field communications (NFC), IEEE 802.15.4, Bluetooth low energy (BLE) channels, among other technologies, can be used, allowing the gateway device 110 to signal its presence to an attestation device and prompt the attestation device to send data to the gateway device over the channel. For communications with backend management systems, the gateway device 110 can utilize wider area communications technologies, such as WiFi, wireless broadband (e.g., 3G, 4G, LTE, etc.), among other technologies. Communications between the gateway device and management system can be encrypted, such as through conventional encryption techniques such as secure sockets layer (SSL) and other technologies.

As noted above, in some examples, a gateway device 110 can be used, under direction of a management system, in the initialization of an attestation device. For instance, in the example of an attestation device implemented as an in-package sensor, initialization of the device 105 can be carried out in connection with the initial shipment of the package. The gateway device that is to perform the initial scan (i.e., before the shipment begins) can be tasked with assisting in the initialization of the corresponding attestation device, including the provisioning of the secret data on the attestation device. Accordingly, gateway devices that are to participate in attestation device initialization can be further secured, for instance, with identity and attestation capabilities of their own (e.g., through PKI data and supporting logic), as well as other security features, such as a secure boot based on a trusted platform module (TPM) on the gateway device, among other examples. Indeed, in some implementations, a trusted gateway device used to provision a secret from the management system to an attestation device can be equipped with logic to destroy the secret from its own memory after transmitting it to the attestation device and verify destruction of the secret (e.g., to the management system with which it is paired).

As noted above, in some implementations, the attestation device generates and reports log data to a management system through one or more gateway devices. The sensor device can be mated with a particular secure log managed by one or more particular management systems. All sensor log messages can be self-secured, data stamped, and sequenced. In this context, the gateway can serve, simply, as a store-and-forward mechanism. Log messages can further include a crypto-hash of the log message's payload and the secret data of the sensor device. This can secure and make the log message self-verifying, as the corresponding management system can have knowledge of both the secret data and technique used by the attestation device to encrypt the log message, thereby allowing the management system to not only verify integrity of the log message, but also decrypt the contents of the message.

A management system 120 can be implemented as one or more computing devices, such as server systems or systems provided in a cloud-based environment. Management systems can include a secured log component and a data analysis component. In some implementations, these components can be provided in the same system or network and even on the same host device. In other instances, log storage and log data analysis can be carried out separately and independently by different systems, among other implementations. A management system 120 can further manage a set of gateway devices (e.g., 110). For instance, a management system 120 can maintain data describing each gateway device in the set together with identity information, such as through a PKI directory, which can both store the public keys for each of the gateway devices in the set as well as provision keys on the gateway devices. To manage attestation devices, the management system 120 can include a symmetric secrets server tracking the secret data provisioned on each active attestation device initialized and managed by the management system. In implementations where the attestation devices include random number generation logic for use in cryptography performed at the attestation device, the management system 120 can also store corresponding seeds provided at each device. Provisioning and storage of shared secrets can be based on PKI authentication. For example, attestation device 105 may contain a hardware root of trust that is implemented using asymmetric cryptography in trusted execution environment and further include a corresponding asymmetric key signed by a certificate authority (CA), at manufacturing time. By leveraging the trust of this CA, a secure connection may be established between a trusted management system 120 and attestation device 105 in order to provision initial shared secrets. In connection with the initialization of an attestation device, the management system 120 can also create an initialization package and provide this to the attestation device through a trusted gateway device. In one example, the initialization package can contain a full image of all memory of attestation device 105 and including a shared secret S1. Upon being initialized with said initialization package, the attestation device 105 can send a log message that includes a hash of its program image and the secret (e.g., 240). Using its knowledge of the initialization package, the management system 120 may verify this hash and ensure that the device is correctly initialized.

Figure 4:
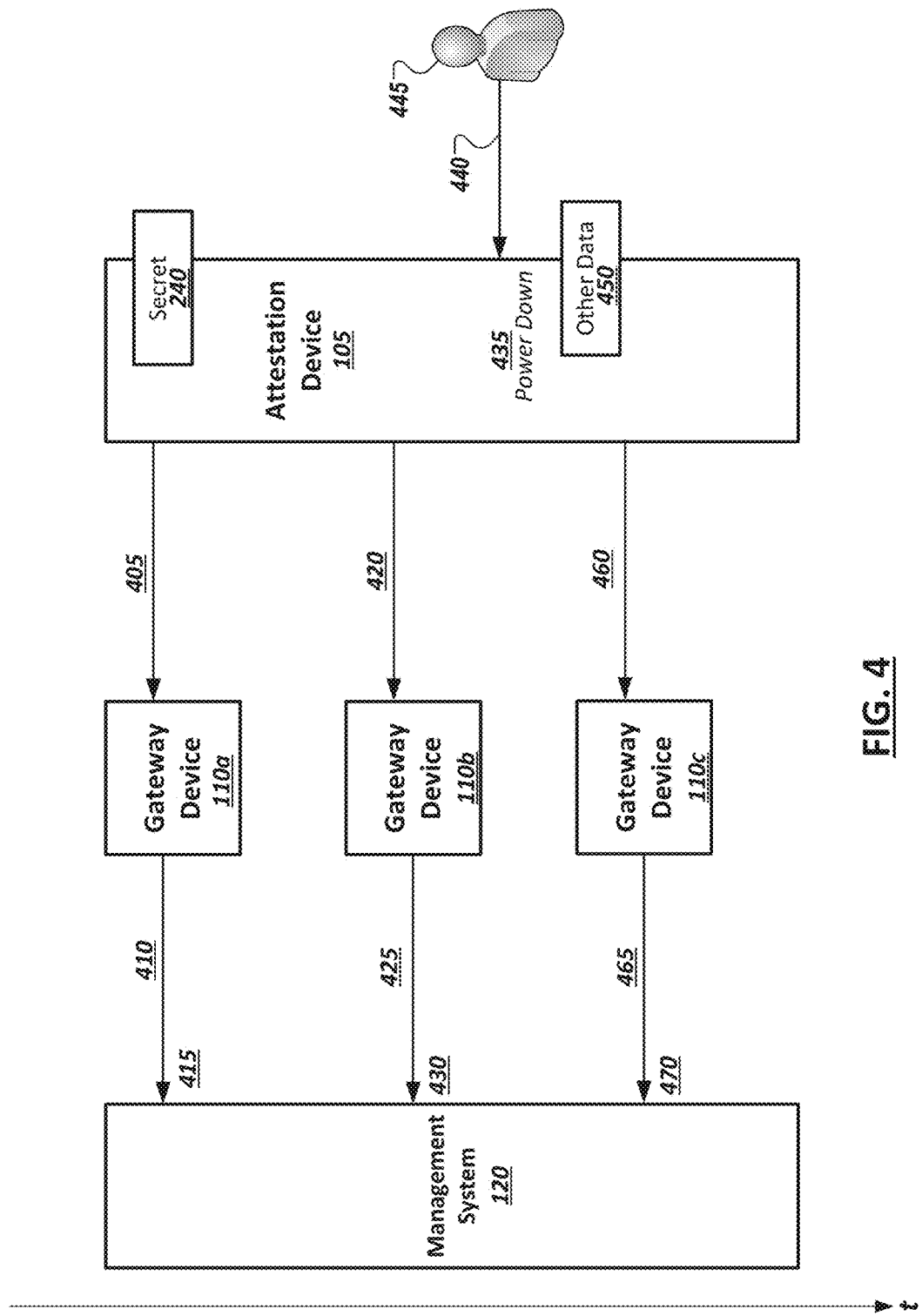
FIG. 4 is a simplified block diagram representing example communications involving an attestation device and one or more gateway devices in accordance with one embodiment.

Turning to FIG. 4, a simplified flow diagram 400 is shown illustrating example techniques for verifying the integrity of an attestation device 105 in accordance with at least one embodiment. For instance, attestation data 405 can be generated by an attestation device 105 from one or more secrets stored securely within the attestation device at a first instance of time. The attestation device 105 can send the attestation data 405 to a first gateway device 110*a* over a short range wireless channel. In some cases, the attestation data is sent in the clear, in other instances the attestation data include encrypted data. In some cases, the attestation data can be sent with log data generated by sensors on the attestation device. The gateway device 110*a* can send attestation data received from the attestation device 105 to a secure log of a management system 120 over one or more wide area networks. The management system 120 can share knowledge of the secret 240 and can validate (e.g., at 415) the attestation data to conclude that the attestation data retains the originally-provisioned secret and has not been tampered with.

Continuing with the example of FIG. 4, at a later instant, the attestation device (still provisioned with the original secret 240) can be scanned again to cause attestation data to be sent (or retrieved) from the attestation device 105. The attestation device 105 can be scanned by the same (e.g., 110*a*) or a different (e.g., 110*b*) gateway device at this later instant. The gateway device 110*b* can cause this attestation data 420 to be forward (at 425) to the management system 120 again, where the integrity of the attestation device 105 can, again, be verified (at 430) by the management system 120. However, at a third instant in time, power can be lost (at 435) at the attestation device 105. The power loss event 435 can be due to a malfunction of the device 105 or its power supply, the battery of the device 105 expiring, or from a forced reset or other event caused by activities 440 by an actor 445. In one example, an attempt (e.g., 440) to modify firmware or data on the attestation device (e.g., in flash memory) can involve a power down event. This can cause the secret 240 to be lost and replaced by null or other data (e.g., 450). Accordingly, the next time a gateway device (e.g., 110*c*) contacts the attestation device 105 and attestation data 460 is generated by the attestation device 105 in response, this time from the incorrect secret data 450, invalid attestation data 460 results. When forwarded (at 465) from the gateway device 110*c* to the management system 120, the management system inspects the attestation data and concludes (at 470) that does not match what is expected based on the original provisioning of the attestation device at initialization. The management system 120 can log this as an event to indicate that integrity of the attestation device (and any other data received from the attestation device following the event) has been compromised.

Figure 5:
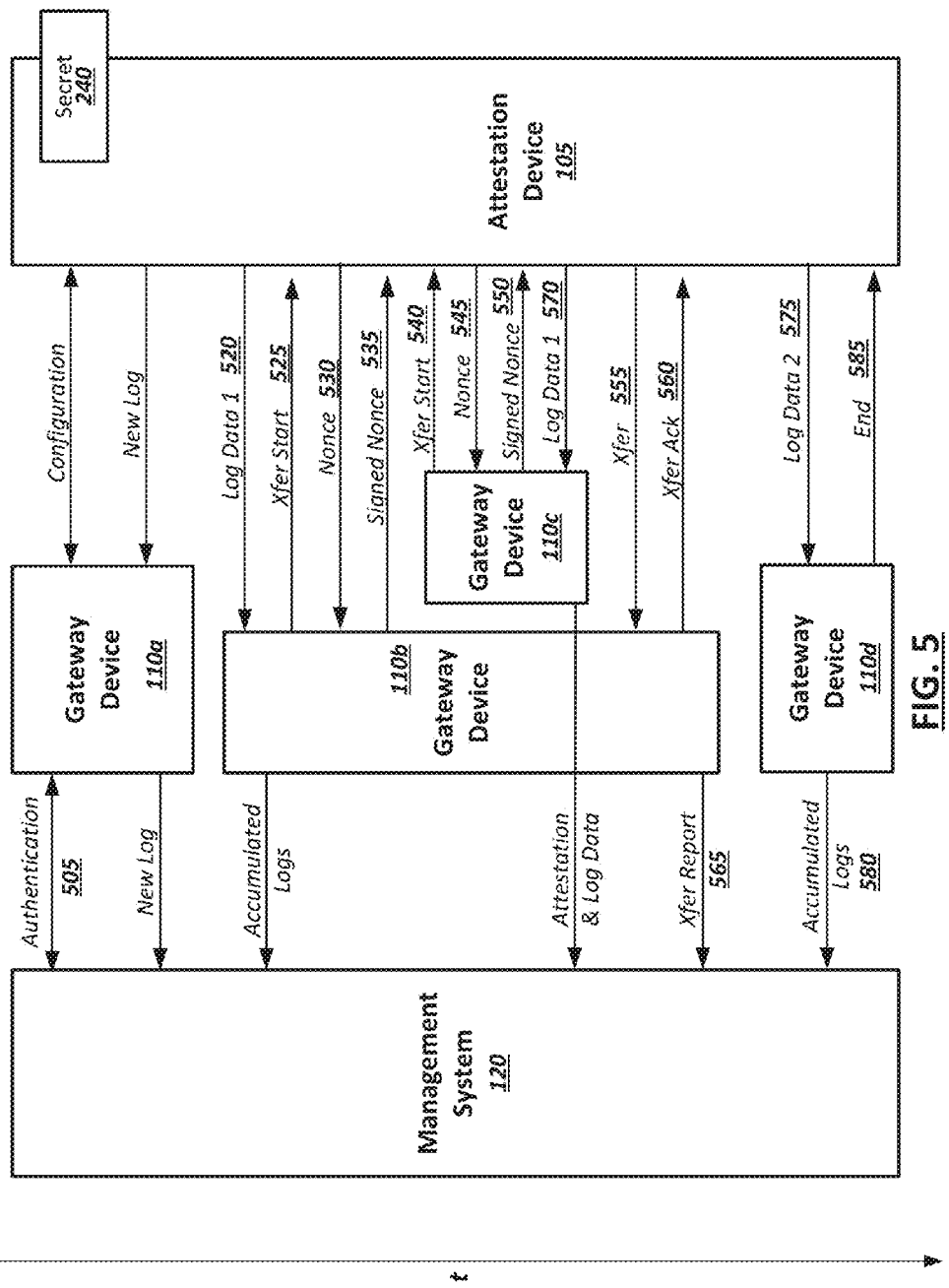
FIG. 5 is another simplified block diagram representing example communications involving an attestation device and one or more gateway devices in accordance with one embodiment.

FIG. 5 illustrates another flow chart corresponding to another example use of an attestation device, such as a particular sensor device 105 included in a package to monitor conditions of the package during a shipment (such as in the example of FIG. 3). For instance, prior to deploying the sensor attestation device 105 within in its environment, the attestation device can be initialized or configured 510. A gateway device (e.g., 110*a*) can be used to configure the attestation device 105, for instance, by communicating a secret, random number generator seed, firmware image, management system identifier or address (for use in directing gateway devices' forwarding of the log data), and/or other data to be stored in memory of and used by the attestation device. Secret data can be written to a volatile portion of the attestation device's memory at power-up, while the firmware image and log data generated by the sensor device 105 can be stored in non-volatile memory segments, among other example configurations (e.g., all data stored in volatile memory).

Given the sensitive nature of the initial configuration 510 of the attestation device 105, the gateway device, itself, can be authenticated 505 by the management system 120 responsible for initializing and managing the attestation device. For instance, the management system can require authentication data from the gateway device 110*a* to verify the integrity of the gateway device 110*a* before sending the secrets to the gateway device 110*a* for provisioning on the attestation device 105. In one implementation, the authentication data sent from the gateway device 110*a* to the management system 120 during authentication 505 can include a public key of the gateway device signed by a private key of the gateway device, among other example implementations. In another implementations, the configuration of the attestation device can be carried out in a secure location where the gateway devices (e.g., 110*a*) used are implicitly or explicitly authenticated and trusted, among other example implementations.

In the example of FIG. 5, upon authenticating 505 the initiating gateway device 110*a*, the attestation device can be configured 240, with the gateway device 110*a* sending a secret S1, an RNG seed, an address ("log_add"), such as an IP address, port number, etc., of the corresponding management system 120, and the firmware image to be used by the attestation device 105. The sensor can store the secret S1 and RNG seed as secret data 240, generate a random number ("rand_no") from the seed, and generate an initial log message (in accordance with the specified firmware image). In this example, the initial log message can embody the attestation data and equal: Hash[S1, rand_no, log_add, running firmware], where Hash[ ] is a cryptographic hash function. The initial log message 515 can be sent through the initializing gateway device 110*a* to the management system. The initial log message 515 can additionally include, in some instances, the management system address log_add (e.g., where the attestation device's log data will be eventually stored and managed) and a message identifier (e.g., the number of the message instance in a session). The management system 120 can then verify the initial log message 515 and communicate the results of the verification to a user through a user interface of the gateway device 110*a* or another user computer capable of communicating with the management system 120. In another example, the management system 515 can pre-calculate the value that is expected for the initial log message 515 and send this hash value to the initializing gateway device to allow the comparison of the expected hash with the initial log message 515 to be performed at the gateway device 110*a* itself. If the hashes are identical, the user can be presented (e.g., at the gateway device 110*a*) with confirmation that the sensor attestation device 105 is ready for deployment. If the hashes are different, however, configuration of the device 105 can be considered incorrect causing the device firmware to be updated (e.g., using an external procedure (e.g., JTAG security)) or the device 105 to be replaced with another sensor attestation device.

In the example of FIG. 5, after deployment of the attestation device 105, the gateway device 110*a* (or another gateway 110*b*) can be used to scan the attestation device. For instance, in the example of FIG. 5, gateway device 110*b* can be brought within proximity of the attestation device 105 and prompt the attestation device 105 for attestation and/or log data. In this example, the attestation device 105, in response, can assemble all accumulated log data and generate attestation data from a cryptographic hash of the secret S1, a random number generated from the seed, a message sequence number for the log message within the session, and the content of the logs. The determined hash value can be appended to a package of data including the log message content, the sequence number, and the address of the management system. The package of data 520 can be sent to the gateway device 110*a* over a short range wireless channel and the gateway device 110 can forward the data to the management system 120.

In some implementations, the content of the logs of the attestation device 105 may also be encrypted (e.g., at the attestation device) through a symmetric encryption scheme utilizing the secret S1 as the key, among other examples. The management system 120 can use the log as statistical data (e.g., as collected from sensors on the device 105), such as in the case of an in-package sensor device where the logs can be used to determine how environmental conditions change in transit. The portion of the attestation device's log at a particular time (spanning from when it was initialized in a session to the particular time) can serve as a "prefix." The prefix of the log at any time can form a receipt that proves the condition of the package at the corresponding instant in time. The prefix can also be used for enabling the custody transfers between two entities, using two gateway devices. Further, the sensor attestation device 105 can retransmit old log messages that have already been sent or always transmit all log entries it has buffered (thereby flushing its buffer), to thereby implement a ring buffer of log entries in the available memory of the attestation device. In such instances, authentication of each gateway device that is to collect the log messages can be foregone.

In some implementations, an attestation device can be configured with logic (e.g., at least partially implemented in the firmware image) to support a transfer protocol. In one example of the transfer protocol (illustrated in FIG. 5), a gateway device 110*a* can indicate (525) that a transfer of custody or control is to take place. A protocol can be defined to verify the nature and participants of the transfer of custody. Transfers of custody can refer to the passing of control, possession, or responsibility for a product monitored by a sensor device from one party to another. The parties can include two organizations, departments, companies, or entities and individual users associated with the participating parties. Each of the two parties' users participating in the hand-off can have a respective gateway device (e.g., 110*b*, 110*c*). In a first example, illustrated in FIG. 5, to initiate a transfer, a user of the gateway device 110*b* can indicate that a transfer is to take place and a start of transfer notice 525 can be sent, in response, by the gateway device 110*b* to the attestation device 105. In response, the attestation device 105 can generate a nonce and return it (at 530) to the gateway device 110*a*. The gateway device 110*a* can then sign the nonce (e.g., with its PKI key) and return the signed nonce 535 to the attestation device 105.

Continuing with the previous example, the second gateway device 110*c* (associated with the entity to which custody is to be transferred) can also send a start of transfer message 540. The attestation device 105 can determine that start of transfer message 540 corresponds to the same transfer as the start of transfer message 520. For instance, the attestation device 105 can determine that a transfer is "open" in that only one gateway device (e.g., 110*b*) as reported to the attestation device 105 and can conclude that the second-received start of transfer message (e.g., 540) (received while the transfer is open) corresponds to the other participating party in the transfer. In another example, the attestation device 105 can keep a transfer open for a particular period of time (following receipt of an initial start of transfer message (e.g., 525) and allow a corresponding second start of transfer message 540 to be received within a defined window of time). In still another example, the participating gateway devices (e.g., 110*b*, 110*c*) can include logic allowing the gateway devices to intercommunicate and jointly determine an identifier for the transfer. This identifier can be included in each of the start of transfer messages 525, 540 to identify that their communications (to the attestation device 105) correspond to the same transfer. In one example, the identifier can include a device identifier of the other participating gateway or identifiers (e.g., hashed or concatenated) of both participating gateways, among other potential examples.

As in its interaction with the transferring gateway device (e.g., 110*b*), the attestation device can respond to a start of transfer message 540 received from the transferred-to gateway device 110*c* a nonce (e.g., 545). The nonce 545 can be a copy of the same nonce 530 provided to the first gateway device (e.g., 110*b*) in the transfer transaction. The second gateway device 110*c* can also sign and return the nonce (at 550) using a certificate or key (e.g., PKI key) stored securely at the second gateway device 110*c*.

The attestation device 105, upon receiving (at 535, 550) copies of the nonce signed by each of the participating gateway devices (e.g., 110*b*, 110*c*) can utilize the signed nonces 535, 550 to generate a transfer message 555 that indicates and affirms the custody transfer to the management system. In one example, the transfer message 555 includes a value generated from a hash of at least the attestation device's secret (S1) and the signed nonces of each of the participating gateway devices (as signed by one of the gateways involved in the handoff) to authenticate the transfer. In another example, transfer message 555 can be sent together with log data (e.g., 520) and the transfer message 555 can include a hash of the attestation device's secret (S1), the signed nonce (as signed by a first of the two gateways involved in the handoff), another signed nonce (as signed by the second of the two gateways), and the log data, as well as the log data itself. In some implementations, each of the gateway devices 110*c,d*, in their respective start of transfer messages can include an identifier of each respective gateway devices. The identifiers can also be incorporated in the transfer message 555, among other information and examples (such as the specific example provided below). The transfer message 555 can be sent to either or both of the transferring (e.g., 110*b*) or transferred-to (e.g., 110*c*) gateway devices for forwarding to management system 120 (at 565). The gateway can send the attestation device 105 an acknowledgment 560 of the receipt of the transfer message 555. In some instances, the attestation device 105 can record completion of the transfer in its log data (e.g., based on the acknowledgement 560).

Continuing with the example of FIG. 5, following a transfer, the transferred-to gateway (e.g., 110*c*) can receive attestation data and/or log data (570), participate in a subsequent custody transfer, communicate with the management system 120 regarding these interactions with the attestation device, among other activities. In this example, another gateway device 110*d* may also subsequently scan the attestation device 105. As with other scans, the attestation device 105 can respond by sending the gateway device 110*d* with log data and attestation data (e.g., 575). The gateway device 110*d* (as with other scans) may report the attestation and log data to the management system 120 (at 580). In this case, gateway device 110*d* may be associated with the same entity as gateway device 110*c* and no transfer takes place using the transfer protocol. Further, gateway device 110*d* may be remote from gateway device 110*c* (e.g., representing a next stop on a journey of a package). In cases where gateway devices are not collocated (as with gateways 110*b*, 110*c*) a transfer protocol may not be supported. In the event a gateway (e.g., 110*d*) is the last stop on a chain of possessions of the attestation device (e.g., on a shipping or delivery route), the gateway device 110*d* can send an end of session message 585, which the attestation device can log (and in some cases respond to with a final transmission of log data for forwarding to the system manager 120 to indicate the system manager that the session has ended (and that gateway device 110*d* was involved in the conclusion of the session)).

In one specific example, log data (e.g., 520, 570, 575) generated by the attestation device for delivery to the management system 120 via a gateway device (e.g., 110*a-d*) can embody the attestation data. For instance, the attestation device 105 can generate a message that includes a hash of the secret, a message number (e.g., to identify an order of the message in a session), and the log data. This hash can represent the attestation data. The message can further include an identification of the message number and a copy of the log data. The management system 120 (having knowledge of the attestation device's secret) can utilize the message to attempt to regenerate the attestation data (hash) to verify the integrity of the attestation device 105. In another specific example, the transfer message 555 can include or be based on the log data or the log data message (including the hash of the raw log data and the attestation device's secret). For instance, in one example, the transfer message 555 can be generated by hashing the nonce (e.g., 530, 545), the copy of the nonce signed (e.g., 535) by the transferring gateway, the copy of the nonce signed (e.g., 550) by the transferred-to gateway, and the log message (or, alternatively, the attestation data only (e.g., hash of the secret, a message number, and the log data)). The transfer message 555 may also include a copy of the log data or the log message (e.g., from which the management system 120 can complete its verification of the authenticity of the transfer message 555).

In one specific implementation of a custody transfer between two gateway devices (e.g., as in the example of FIG. 5 involving gateways 110*b-c*), a protocol can be defined that involves communication (e.g., over a short range communication channel) between the two gateway devices involved in the transfer. For instance, a first of the gateway devices, such as the gateway (e.g., 110*b*) currently associated with custody of the attestation device 105, can send an initiate message to the other gateway (e.g., 110*c*) when within close proximity (e.g., within range) of the other gateway 110*c*. In this particular example, the initiate message can identify the first gateway 110*b*. For instance, the initiate message can include a value equal to a concatenation of a random number $c_1$ (generated by the first gateway) and a device identifier, $id_1$, of the first gateway (e.g., a PKI public key of the gateway signed by the private key of the gateway). The second gateway 110*c* can verify that no other transfer of custody is underway involving the gateway 110*c* and can respond by generating a transfer of custody request (e.g., 540) to be sent to the attestation device 105. The transfer of custody request can identify both of the gateway devices involved in the transfer. For instance, the transfer of custody request can have a value equal to a concatenation of $c_1, id_1, c_2, id_2$, where $c_2$ is a random number generated by the second gateway and $id_2$ is a device identifier for the second gateway. Upon receiving the transfer of custody request the attestation device can verify that no other transfer of custody of the attestation device is on-going other than the instance (e.g., as identified from the random numbers $c_1, c_2$) of the protocol with these gateways parties (e.g., as identified from gateway identifiers $id_1, id_2$). In response, the attestation device can generate and send a transfer of custody response, D, to one or both of the gateways (in the case of one gateway, the receiving gateway can forward the transfer of custody response, D, to the other participating gateway). In one example, the transfer of custody response, D, can be generated according to the following:

h=hash[S1, $id_D$, $id_L$, firmware-image, prior-xfer]
commit=hash[$c_1$, $id_1$, $c_2$, $id_2$, d, $id_D$, h]
D=concatenate[$c_1$, $id_1$, $c_2$, $id_2$, d, $id_D$, commit];

where $id_D$ is an identifier of the attestation device, $id_L$ is an identifier (or address) of the management system (e.g., 120), and d is a random number generated by the attestation device. The value, prior-xfer, can be an identifier of the previous instance of a transfer-of-custody involving the attestation device 105 in a session. The value, at configuration, of prior-xfer can be set initially to a null string. prior-xfer can used by the protocol to make the attestation device's measurement to its internal state unpredictable to an attacker that might have recorded a prior transfer of custody involving the attestation device. The hash value commit to publish its view of the protocol instance and participants, and commit itself to its internal configuration and state, which is represented by h.

Each of the participating gateways can process the transfer of custody response, D, to verify the response corresponds to the current custody transfer. For instance, a first gateway (i.e., that initiating the protocol) can verify that the values verify $c_1$, $id_1$ correspond to those included in the initiate message, while the second gateway (i.e., that sent the transfer of custody request to the attestation device) can verify the values of $c_1$, $id_1$, $c_2$, $id_2$ in the transfer of custody response correspond to those from the request message, among other example implementations.

Identifier values used in the messages sent within a custody transfer protocol can correspond to secured or hardware based identifiers of the respective gateway devices and attestation device. In one example, $id_1$ and $id_2$ are the respective identities of $C_1$ and $C_2$ from cert($pk_1$, $id_1$) and cert($pk_2$, $id_2$). The identifier of the attestation device, in some cases, can correspond to the product or entity being monitored or tracked using the sensor attestation device. For instance, $id_D$, can be the tracking number for the package the attestation device is monitoring). Random numbers used in the protocol (e.g., $c_1$, $c_2$, and d) can be bit strings chosen uniformly at random from the set of all bit strings of sufficient size (e.g., 128 or 256 bits in an implementation) and can respectively represent the respective views of the gateway devices and attestation device of the instance of the protocol. In the example above, the hash value commit to publish its view of the protocol instance and participants, and commit itself to its internal configuration and state, which is represented by h.

In one example, the gateway (e.g., 110*b*) currently in custody of the attestation device can initiate a transfer (and corresponding protocol) by sending an initiate message to the other gateway (e.g., 110*c*). In other instances, the gateway receiving custody can initiate the transfer and protocol. The initiate message can synchronize the participating gateways. In one example, the initiating gateway can generate the initiate message by generating a random number (e.g., $c_1$) and concatenating it with an identifier (e.g., $id_1$) of the initiating gateway. The second gateway, upon receiving the initiate message can verify that no other transfer of custody is pending and can send a transfer of custody request to the corresponding attestation device (i.e., both the first and second gateway are within physical proximity of the attestation device during this exchange). In one example the transfer of custody request can be formed as a concatenation of respective random numbers (e.g., $c_1$, $c_2$) generated by each of the participating gateways and respective identifiers (e.g., $id_1$, $id_2$) of each of the participating gateways. Upon receiving the transfer of custody request the attestation device can verify that no other transfer of custody of the attestation device is on-going other than the instance (e.g., as identified from the random numbers $c_1$, $c_2$) of the protocol with these gateways parties (e.g., as identified from gateway identifiers $id_1$, $id_2$).

Upon each of the participating devices (e.g., both gateways and the attestation device) verifying that the instance of a transfer of custody protocol corresponds to each of the participating gateways and the particular attestation device, the transfer can proceed. If any of the participating devices (e.g., 105, 110*b*, 110*c*) do not verify, or agree upon, the instance of the protocol, the transfer can be aborted. In the case of an agreement, the first gateway can generate a signature, $s_1$. For instance, the first gateway can generate $s_1$ by signing the value of the transfer of custody response, D. The first gateway can generate a transfer of custody confirmation message that incorporates the signature such as according to:

$confirm_1$=concatenate[d, commit, $s_1$, cert($pk_1$, $id_1$)].

The second gateway can process the confirmation message to verify that commit, d are from the transfer of custody response message and verify both cert($pk_1$, $id_2$) and $s_1$. In the event of a verification, the second gateway can generate its own confirmation message, such as according to:

$confirm_2$=concatenate[d, commit, $s_1$, cert($pk_1$, $id_1$)], where $s_2$ is a signature of the second gateway generated according to:

$s_2$:=sign[concatenate[$c_2$, $id_2$, $c_1$, $id_1$, d, $id_D$, commit].

The first gateway can process $confirm_2$ to likewise verify that the values of d, commit, $s_1$ correspond to its confirmation message, $confirm_1$, as well as to verify cert($pk_2$, $id_2$) and $s_2$.

In one example, as noted above, gateway devices can exchange signatures to allow each device to confirm that the other is a party authorized to participate in transfer of custody and has formed a valid signature. Each party signs its own and its peer's identity to defend against mis-binding and other attacks. In one instance (such as described above), the second gateway device can reverse the order of the parameters, in order to defend against reflection and other attacks.

Transfer of custody can continue, in the present example, by the first gateway device (or the second gateway, or both gateways) sending an abbreviated transfer of custody message to the attestation device, such as according to:

$confirm_A$=concatenate[d, commit, $s_1$, $s_2$].

The abbreviated confirmation message, $confirm_A$, can be sent in response to the gateway devices confirming each other's identities and authorization. Upon receiving the abbreviated confirmation message, the attestation device can verify that the values of d, commit correspond to its transfer of custody response, D. If verified, the attestation device can create a confirmation response message, $confirm_D$. In one example, the confirmation response message, $confirm_D$ can be according to:

$confirm_D$=concatenate[$c_1$, $id_1$, $c_2$, $id_2$, d, $id_D$, $s_1$, $s_2$, h, p, timestamp, t], where
timestamp=clock;
p=hash[$c_1$, $id_1$, $c_2$, $id_2$, d, $id_D$, timestamp]; and
t=hash[key, $c_1$, $id_1$, $c_2$, $id_2$, d, $id_D$, $s_1$, $s_2$, h, p, timestamp];

The attestation device can send the confirmation response message, $confirm_D$, in response to the abbreviated confirmation message. The receiving gateway device can verify from the confirmation response message that $c_1$, $id_1$, $c_2$, $id_2$, d, $id_D$ are from the custody transfer response message, verify that the $s_1$ is from the abbreviated confirmation message, and verify that commit=hash[$c_1$, $id_1$, $c_2$, $id_2$, d, $id_D$, h], among other tasks. Upon performing these verifications, the gateway device can report the transfer to a management system corresponding to the attestation device. For instance, the gateway device can generate and send a transfer log message to the management system, $log_1$ according to:

$log_1$=concatenate[$c_1$, $id_1$, $c_2$, $id_2$, d, $id_D$, $s_1$, $s_2$, h, p, timestamp, t, cert($pk_1$,$id_1$), cert($pk_2$, $id_2$)].

The second gateway device can also receive the confirmation response message (either directly from the attestation device or as forwarded by the other gateway device) and assess the confirmation response message to verify that the values of $c_1$, $id_1$, $c_2$, $id_2$, d, $id_D$ correspond to those in the custody transfer response message, verify that $s_1$, $s_2$ are from the confirm-confirm message, $confirm_2$, and verify that commit=hash[$c_1$, $id_1$, $c_2$, $id_2$, d, $id_D$, h], among other tasks. Upon performing these verifications, the second gateway device can also report the transfer to a management system corresponding to the attestation device. For instance, the second gateway device can generate and send a transfer log message to the management system, $log_2$, according to:

$log_2$=concatenate[$c_1$, $id_1$, $c_2$, $id_2$, d, $id_D$, $s_1$, $s_2$, h, p, timestamp, t, cert($pk_1$,$id_1$), cert($pk_2$, $id_2$)].

The management system can receive both log messages and confirm that they are consistent. For instance, the management system can verify t and h match their respective expected values, verify cert($pk_1$, $id_1$), $s_1$, cert($pk_2$, $id_2$), and $s_1$ among other values. Upon verifying the transfer, the management system can create a record describing the transfer, as well as, in some instances, sending receipt data to each of the participating gateway devices, among other examples.

Additional features can be implemented in a transfer of custody protocol. For instance, to subvert an active man-in-the-middle or other attack, another symmetric key can be provided on the attestation device and a key distribution exchange can be between the participating gateway device and a key distribution center (KDC) to configure appropriate keys the gateway devices. The new symmetric key can be translated (e.g., by the KDC) into device specific keys so that the gateway devices do not learn the symmetric key's value, such as the by computing $k_1$:=kdf(k, $id_1$) and $k_2$:=kdf(k, $id_2$), where kdf is any suitable key derivation function (e.g., the 9.63 hash-based key derivation function). In another example, in order to check whether the party relinquishing custody of a given attestation device was the last party to receive custody, the management system can perform the check ex post (from data received that reports the transfer as completed by the gateway devices) while allowing the transfer to make forward progress even after situations where the custody transfer was not properly completed in a previous handoff, among other example features.

Figure 6:
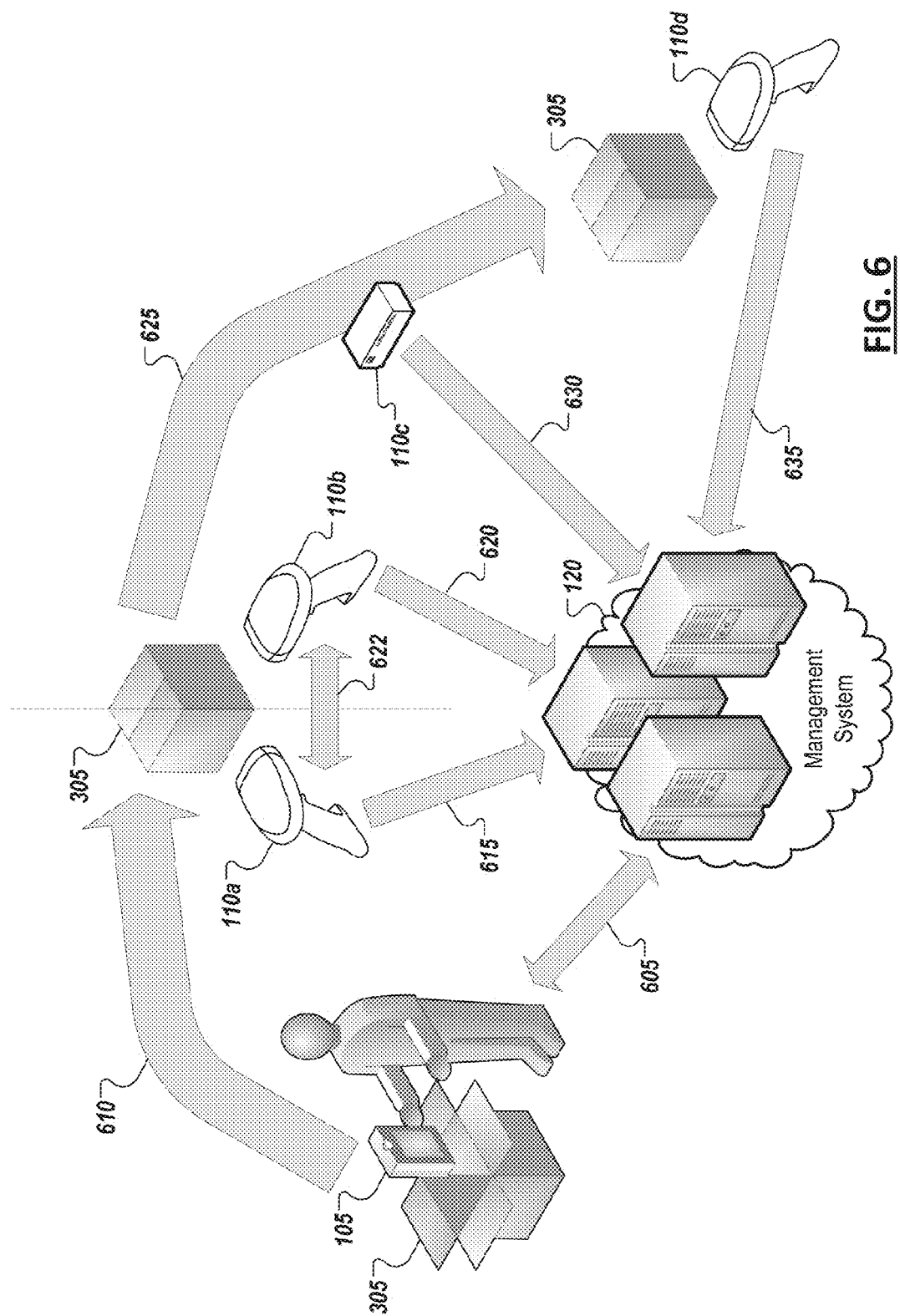
FIG. 6 is a simplified block diagram representing use of an attestation device as a package sensor in accordance with one embodiment.

FIG. 6 illustrates a block diagram illustrating an example use of a sensor attestation device as a shipping package sensor. A user can place a sensor attestation device 105 in a package 305 and seal the package 305 for delivery. Initialization/configuration 605 of the attestation device 105 using management system 120 can be completed by the user prior to or after the attestation device 105 has been sealed inside the shipping package 305. The package can begin shipment along a first leg 610 of a route. Upon arrival at a weigh station or other via point at the conclusion of the route, a gateway device 110*a* can scan the package to initiate communication with the sensor attestation device 105 within the package 305. The gateway device can collect log data generated by the sensor attestation device 105 during the first leg 610 and can forward this information (along with attestation data generated by the attestation device 105) to the management system 120.

Further, in some implementations, a handoff of the package 305 can take place, for instance, as the package 305 transfers custody between a first driver or delivery person and another (either of the same or a different entity). A second gateway device 110b can be used to scan the package 305 at the arrival at the via point and report (e.g., 620) the change of custody (e.g., including associated log and/or attestation data) to the management system 120. Causing attestation and log data to be collected and reported to the management system 120 at such handoffs can be beneficial, for instance, in pinpointing the specific leg in a route where spoilage, an accident, a delay, opening of the package (e.g., from a change in temperature, humidity, or pressure measured by the sensor device 105), tampering with the sensor device, or another event took place involving the package 305. Such information can be used, for instance, to provide feedback, assign responsibility, or initiate remediation of the event, among other example uses. Further, as described above, a custody transfer protocol can be implemented that includes communication 622 between two collocated gateway devices (e.g., 110a-b) present at the via point, one handing off the package and the other accepting the package.

Continuing with the example of FIG. 6, the shipment of the package 305 can continue along a second leg 625 of the route. In one example, an internet-connected gateway device 110c can be provided in the vehicle providing transport of the package 305 during the second leg 625 of the shipment. This in-vehicle gateway 110c can provide more frequent or even continuous scans of the sensor device 105 during the second leg 625 to collect log data and attestation data from the sensor device 105 and report 630 this data to the management system 120. In such instances, events can be detected and reported well in advance of the next shipment via point allowing the management system 120 to detect the issue and generate automated alerts or tasks to assist in remediation of any issues.

Finally, when a package 305 reaches its final destination, another gateway device 110d can be used to scan the package to cause any additional log data (along with attestation data) to be collected and reported (at 635) to the management system. The gateway device 110d, in some implementations, can include an indication with the final log data (or attestation data) that the shipment has concluded and that the use session of the sensor attestation device 105 has ended. In other instances, the management system can determine from the log data that the planned route has ended and conclude the use session of the sensor attestation device 105 autonomously. Accordingly, in some implementations, once the sensor attestation device use session concludes, any subsequent scans of the sensor attestation device can result in an error event until the sensor device has been has been recharged and re-configured in a new use session.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification. For instance, it should be appreciated that a variety of different crypto hash techniques and algorithms can be alternatively employed. Further, while some examples describe the use of random numbers generated by an attestation device, in other implementations, only a single secret may be used, among other examples and alternatives.

FIGS. 7A-7D are simplified flowcharts 700a-d illustrating example techniques involving an example malware management system. For example, in the example of FIG. 7A, a signal from a gateway device can be received 705 over a short range wireless connection by an attestation device indicating a scan by the gateway device. The attestation device can generate 710 an instance of attestation data based on one or more secrets (e.g., secret values, a seed to generate random numbers for use in generating the attestation data, etc.) stored in a segment of memory with volatile memory properties. Each time the attestation device is called on to generate an instance of attestation data in a use session (e.g., from the same secret(s) as originally provisioned for a particular use or a given battery charge), the instance can be unique within the system (e.g., based on a random number value generated for the instance and hashed with one or more secret values stored on the attestation device). The unique attestation data can indicate to a management system the order of the instance within the session (e.g., the management system can determine that the attestation data corresponds to a particular one of a number of anticipated instances of the attestation data value). The instance of the attestation data can be sent 715 over the short range wireless connection to the gateway device for forwarding to the management system (e.g., over a wide area network connection). To protect the attestation device from tampering, the attestation device can provide that the secret(s) are erased 720, or otherwise lost, in the event of a power loss event at the attestation device.

Figure 7B:
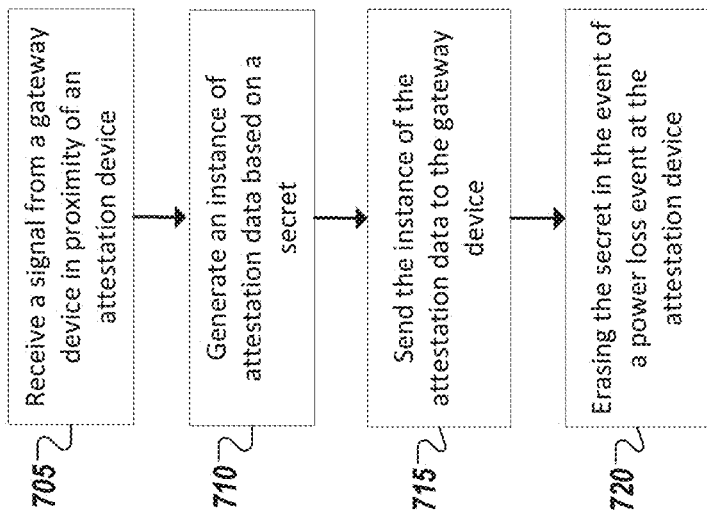
FIGS. 7A-7D are simplified flow diagrams illustrating techniques for using an attestation device in accordance with at least some embodiments.
Figure 7A:
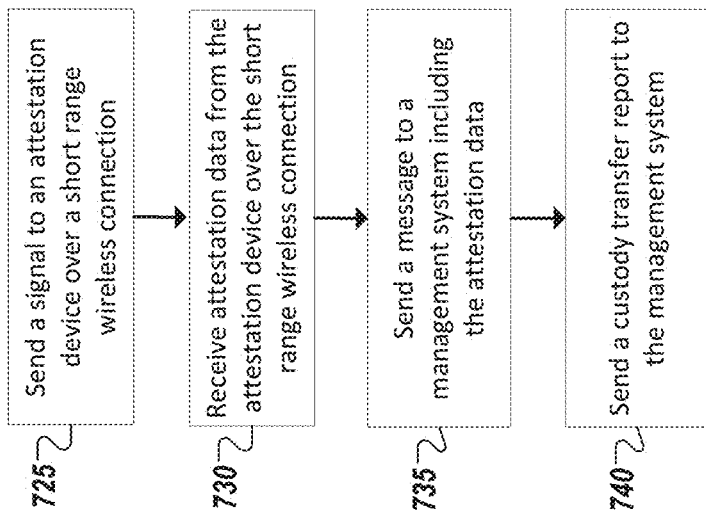

Turning to FIG. 7B, a signal can be sent 725 to an attestation device from a gateway device over a short range communication channel and attestation data can be received 730 from the attestation device in response. In some cases, the attestation data can be sent with log data generated from sensors at the attestation device. The attestation data (e.g., along with any accompanying log data) can be sent 735 from the gateway device to a management system. In some cases, the gateway device can sign the message to indicate that the identity of the gateway device. Further, the gateway device can be involved in a handoff where custody of the attestation device (and potentially another entity (e.g., a person, animal, product, package, etc.) is transferred from one entity to another. In such instances, the gateway device can generate a custody transfer report and send 740 the report to the management system to report the custody transfer. In some cases, the custody transfer report can be generated from or based upon data received from or exchanged between the gateway device, another gateway belonging to the entity taking over custody of the attestation device, and the attestation device. This data can be used to authenticate and/or identify each of the gateway devices and the attestation device to allow the management system to verify the custody transfer based on the report.

Figures 7C, 7D:
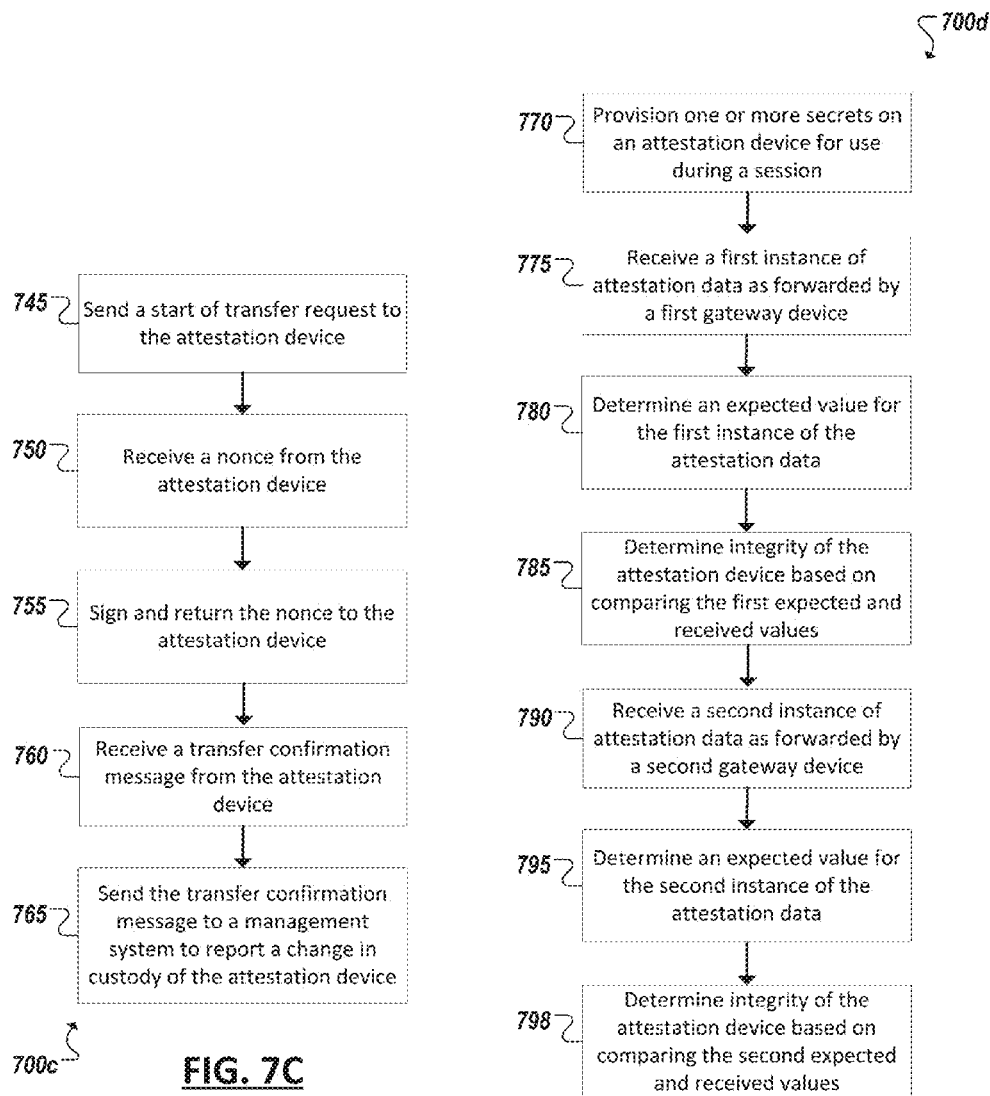

In a specific example, illustrated in FIG. 7C, a gateway device can participate in a custody transfer protocol by sending 745 a start of transfer request message over a short range wireless channel to an attestation device that is to change custody (e.g., along with a corresponding item or thing tracked by the attestation device). A nonce can be received 750 from the attestation device in response to the start of transfer request. The gateway device can sign and return 755 the nonce to the attestation device over the wireless channel. The gateway device can then receive 760 a transfer confirmation message from the attestation device. The transfer confirmation message can be based on the signed nonce and another copy of the nonce signed by the other gateway device participating in the transfer. The transfer confirmation message can additionally be based or generated from (e.g., through a hash) the secret stored on the attestation device. The gateway device can send a message 765 to a remote management system (e.g., over the internet or other wide area network) that includes the transfer confirmation message. The transfer confirmation message can be decipherable by the management system to determine the nature of the transaction, among other examples and features.

Turning to FIG. 7D, a management system can be used to provision 770 one or more secrets on an attestation device for use during a session. The provisioning 770 of the secrets can be in connection with a configuration of the attestation device managed by the management system. The configuration of the attestation device can include the provisioning of a particular firmware image on the attestation device to be used by the attestation device during the session. Further, the provisioning of secrets and/or firmware images on an attestation device can be facilitated by a gateway device under direction of the management system.

During the use session, a first instance of attestation data generated by the attestation device can be received 775 by the management system from a first gateway device. The management system can determine 780 an expected value for the first instance of the attestation data, as the management system includes a copy of the secrets provisioned 770 on the attestation device and know and has access to the logic (i.e., in the firmware image) to be used by the attestation device in generating instances of attestation data. The management system can determine 785 integrity of the attestation device (and any log data corresponding to the instance of attestation data) by comparing the expected value of the attestation data with the received value of the attestation data. Later, during the same session, a second instance of the attestation data generated by the attestation device can be received 790 by the management system from a second gateway device. In some cases, the second gateway device can be a different gateway device under the control of a different entity (e.g., person or organization). The management system can determine 795 an expected value for the second instance of the attestation data and again determine 798 from a comparison of received and expected values of the second instance of attestation data, the integrity of the attestation device (and whether the integrity of the attestation device and its data have been compromised).

Figure 9:
FIG. 9 is a block diagram of an exemplary mobile device system in accordance with one embodiment.
Figure 8:
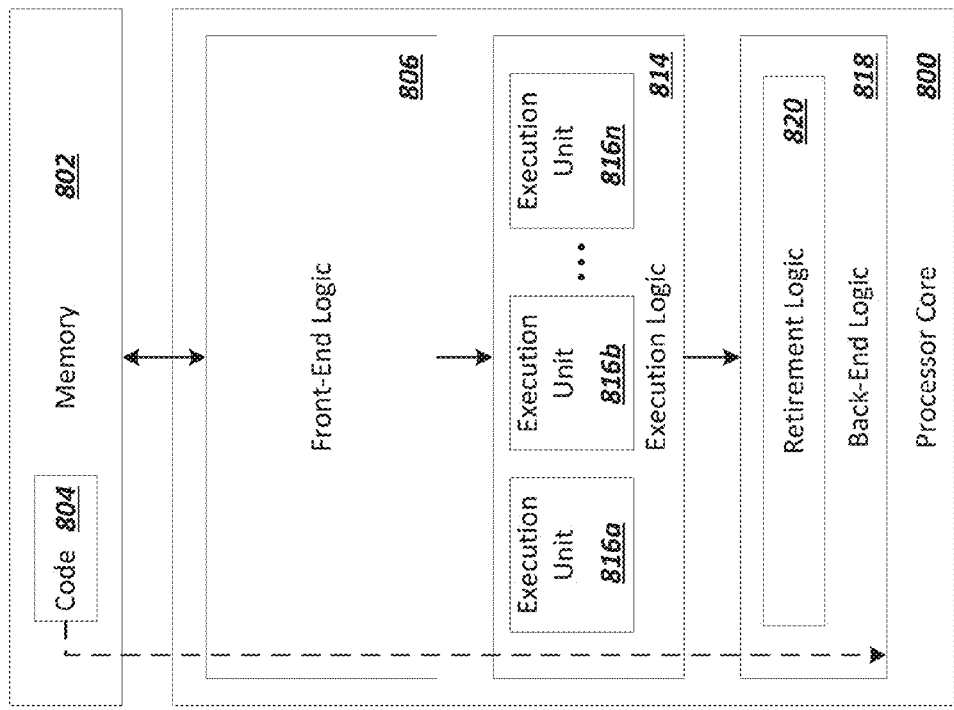
FIG. 8 is a block is a block diagram of an exemplary processor in accordance with one embodiment.
Figure 10:
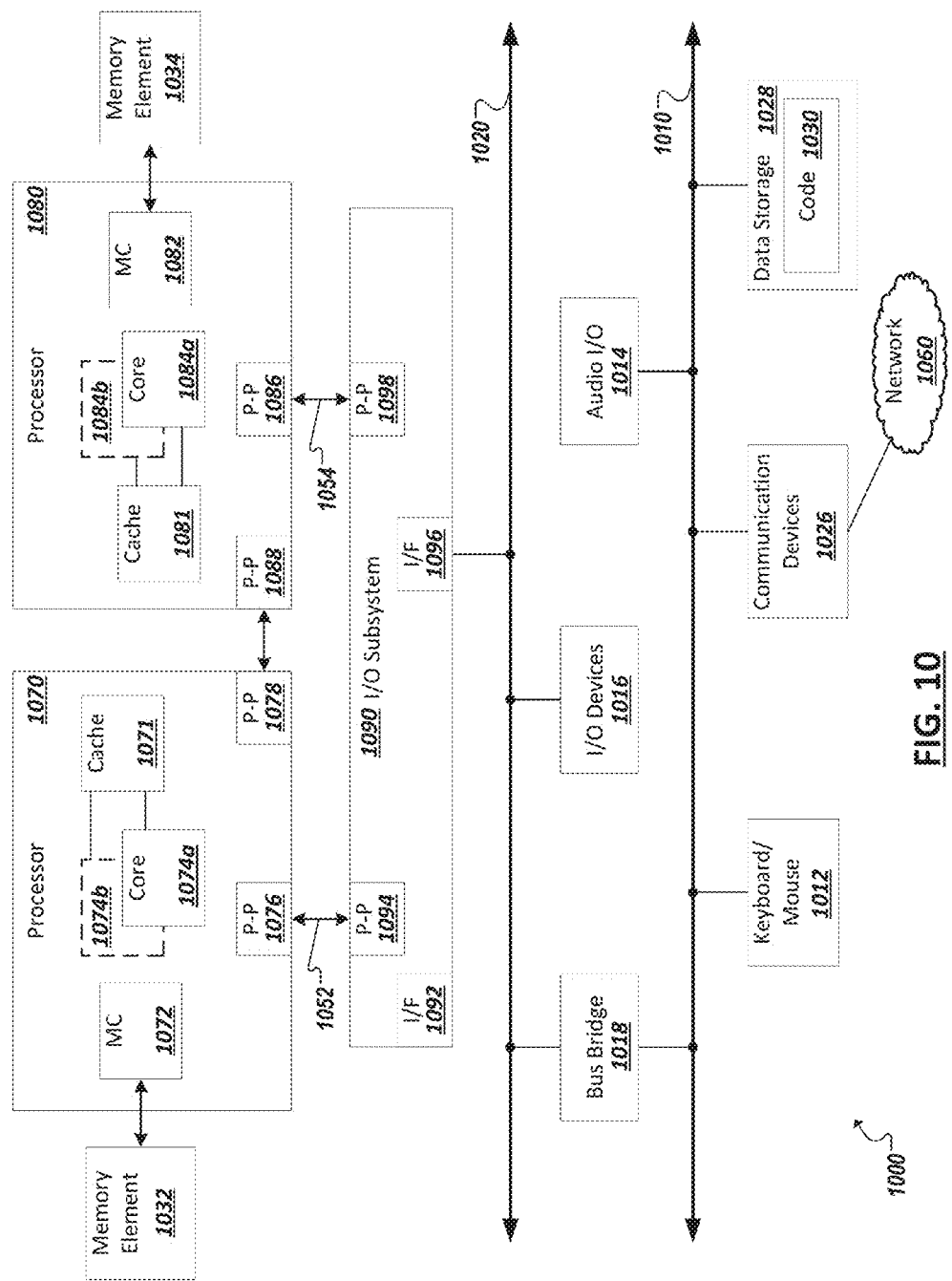
FIG. 10 is a block diagram of an exemplary computing system in accordance with one embodiment.

FIGS. 8-10 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 8-10.

FIG. 8 is an example illustration of a processor according to an embodiment. Processor 800 is an example of a type of hardware device that can be used in connection with the implementations above.

Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

Referring now to FIG. 9, a block diagram is illustrated of an example mobile device 900. Mobile device 900 is an example of a possible computing system (e.g., a host or endpoint device) of the examples and implementations described herein. In an embodiment, mobile device 900 operates as a transmitter and a receiver of wireless communications signals. Specifically, in one example, mobile device 900 may be capable of both transmitting and receiving cellular network voice and data mobile services. Mobile services include such functionality as full Internet access, downloadable and streaming video content, as well as voice telephone communications.

Mobile device 900 may correspond to a conventional wireless or cellular portable telephone, such as a handset that is capable of receiving "3G", or "third generation" cellular services. In another example, mobile device 900 may be capable of transmitting and receiving "4G" mobile services as well, or any other mobile service.

Examples of devices that can correspond to mobile device 900 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 900 illustrated in FIG. 9 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 900 includes a transceiver 902, which is connected to and in communication with an antenna. Transceiver 902 may be a radio frequency transceiver. Also, wireless signals may be transmitted and received via transceiver 902. Transceiver 902 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 902 is connected to a processor 904, which may perform the bulk of the digital signal processing of signals to be communicated and signals received, at the baseband frequency. Processor 904 can provide a graphics interface to a display element 908, for the display of text, graphics, and video to a user, as well as an input element 910 for accepting inputs from users, such as a touchpad, keypad, roller mouse, and other examples. Processor 904 may include an embodiment such as shown and described with reference to processor 800 of FIG. 8.

In an aspect of this disclosure, processor 904 may be a processor that can execute any type of instructions to achieve the functionality and operations as detailed herein. Processor 904 may also be coupled to a memory element 906 for storing information and data used in operations performed using the processor 904. Additional details of an example processor 904 and memory element 906 are subsequently described herein. In an example embodiment, mobile device 900 may be designed with a system-on-a-chip (SoC) architecture, which integrates many or all components of the mobile device into a single chip, in at least some embodiments.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 1000.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a high-performance graphics circuit 1038 via a high-performance graphics interface 1039, using an interface circuit 1092, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a keyboard/mouse 1012 (or other input devices such as a touch screen, trackball, etc.), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

The following examples pertain to embodiments in accordance with this Specification. One or more embodiments may provide a method, a system, a machine readable storage medium with executable code, or an apparatus having at least one processor device, an energy storage module to power the apparatus, memory to store a secret such that powering down and restarting the apparatus causes the secret to be lost, logic executable by the at least one processor device to generate attestation data using the secret that data abstracts the secret, and a communications interface to send the attestation data to another device.

One or more implementations may additional include one or more of the following features. The secret can be stored in a first portion of the memory, the memory including a second portion, and the second portion of the memory may be non-volatile memory. The memory may be random access memory. The second portion of the memory can store log data to be shared with the other device. The attestation data can attest to integrity of the apparatus. The integrity of the apparatus can be conditioned on the apparatus having maintained power throughout a session and the secret can be provisioned to correspond to a start of the session. The apparatus can further include one or more sensors to sense characteristics of an environment corresponding to the apparatus and generate log data for storage in the memory. The attestation data can be generated from a cryptographic hash of the log data using the secret. The attestation data can represent integrity of the log data. The memory can be provisioned with a random number and the attestation data can be generated based on the random number and secret data. The communication interface can receive a signal from the other device and send the attestation data to the other device in response to the signal, and the other device can forward the attestation data to a management system over a network. The apparatus can be implemented as an in-package sensor device to sense conditions during a shipment of the package.

One or more embodiments may provide a method, a system, a machine readable storage medium with executable code to receive, at an attestation device, a signal from a particular gateway device, generate log data from readings of one or more sensors of the attestation device, generate attestation data from a hash of the log data with a secret stored in a memory segment of the attestation device, wherein the secret is to be lost upon restart of the attestation device, and send the attestation data to the particular gateway device.

One or more implementations may additional include one or more of the following features. The attestation device can be configured to load the secret in the memory segment and load a firmware image on the attestation device. The secret and firmware image can be provided by a remote management system. A attestation device can participate with the particular gateway device and at least one other collocated gateway device in a custody transfer protocol.

One or more embodiments may provide a system including one or more processor devices, one or more memory elements, and an attestation manager. The attestation manager can be executable by the one or more processor devices to provision one or more secrets on a particular one of a plurality of attestation devices corresponding to a use session of the particular attestation device; receive a first instance of attestation data collected from the particular attestation device during the use session from a first gateway device, determine an expected value for the first instance of the attestation data from the particular attestation device based on the one or more secrets, compare the expected value for the first instance of the attestation data with the received first instance of the attestation data to determine integrity of the particular attestation device, receive, from a second gateway device, a second instance of the attestation data collected from the particular attestation device during the use session, determine an expected value for the second instance of the attestation data based on the one or more secrets, and compare the expected value of the second instance with the received second instance of the attestation data to determine integrity of the particular attestation device.

One or more implementations may additional include one or more of the following features. The first instance of the attestation data may be different from the second instance of the attestation data, the first instance generated based on a first value of a random number generator based on a particular seed, the second instance generated based on a second value of the random number generator based on the particular seed, and the one or more secrets include a particular secret value and the particular seed. The attestation manager can receive a custody transfer report generated by one of the first and second gateway devices and the custody transfer report can indicate that custody of the particular attestation device has transferred from a first entity associated with the first gateway device to a second entity associated with the second gateway device. The attestation manager can further receive, from the first gateway device, log data generated by one or more sensors of the particular attestation device, where the first instance of the attestation data is associated with the log data, and integrity of the log data is based on comparing the expected value for the first instance of the attestation data with the received first instance of the attestation data. The one or more secrets can be provisioned during a configuration of the particular attestation device associated with the use session, the attestation manager can provide a firmware image to the particular attestation device to be used by the particular attestation device during the use session, and the attestation data can be further based on the firmware image.

One or more embodiments may provide a method, a system, or a machine readable storage medium with executable code to send a start of transfer request to an attestation device over a short range wireless communication channel, receive a nonce from the attestation device in association with the start of transfer request, sign the nonce at the particular gateway device, send the signed nonce to the attestation device, receive a transfer confirmation message from the attestation device, and send a transfer message to a management system to report a transfer in custody of the attestation device involving the particular gateway device and another gateway device.

One or more implementations may additional include one or more of the following features. The particular gateway device can be associated with a first entity and the other gateway device comprises a second entity. The transfer in custody can include a transfer from the first entity to the second entity. The transfer message can include the transfer confirmation message. The transfer confirmation message can be based on log data generated by the attestation device and the nonce. The transfer confirmation message can include the log data and a hash of the nonce and the log data. The hash of the nonce and the log data can include a hash of the nonce, the signed nonce, a copy of the nonce signed by the other gateway device, and the log data. The particular gateway device can communicate with the attestation device over a short range wireless connection.

In some examples, attestation data can be received from the attestation device and the attestation data is forwarded to the management system. Log data can be received from the attestation device and attestation data can be forwarded to the management system. The log data can be integrated in the attestation data. The nonce can be signed using a public key infrastructure (PKI) key of the particular gateway device.

One or more embodiments may provide a method, a system, or a machine readable storage medium with executable code to receive, at an attestation device, a first custody transfer request from a first gateway device, generate a nonce in response to the first custody transfer request, send a copy of the nonce to the first gateway device, receive, at the attestation device, a first signed copy of the nonce from the first gateway device, receive, at the attestation device, a second custody transfer request from a second gateway device, send another copy of the nonce to the second gateway device, receive, at the attestation device, a second signed copy of the nonce from the second gateway device, generate a transfer confirmation message based on the first and second signed copies of the nonce that represents a transfer in custody of the attestation, and send the transfer confirmation message to at least one of the first and second gateway devices.

One or more implementations may additional include one or more of the following features. Attestation data can be generated from secret data stored in the attestation device and the attestation data can be sent to the first gateway device. Secret data can be configured to be erased on a restart of the attestation device. Log data can be generated based on readings of one or more sensors of the attestation device, and the attestation data can include a hash of the secret data and the log data. Generating the transfer confirmation message can include hashing the first and second signed copies of the nonce and the nonce. Hashing the first and second signed copies of the nonce and the nonce can include hashing the first and second signed copies of the nonce, the nonce, and log data of the attestation device.

One or more embodiments may provide a system including a gateway device that includes a short range communications module to send a signal to a particular attestation device and receive attestation data from the particular attestation device, and a second communication module to send a message to a remote management system over a wide area network that identifies the gateway device and includes the received attestation data. The gateway device can further include protocol logic to support a custody transfer protocol that includes sending a custody transfer request to the particular attestation device, receiving a nonce from the particular attestation device in response to the custody transfer request, signing the nonce, sending a signed nonce to the particular attestation device, receiving a transfer confirmation data from the particular attestation device, and sending a transfer message to a management system to report a transfer in custody of the attestation device involving the particular gateway device and another gateway device based on the transfer confirmation data.

One or more implementations may additional include one or more of the following features. The custody transfer protocol can further include identifying another gateway device in proximity of the gateway device and the attestation device, receiving first data from the another gateway device identifying the another gateway device, and sending second data to the other gateway device to identify the gateway device to the other gateway device, where the custody transfer response is based on identifiers of the gateway device and the other gateway device. The system can further include the management system and/or the particular attestation device.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An attestation apparatus comprising:
   at least one processor device;
   an energy storage module to power the attestation apparatus;
   a memory in which a secret is stored on the attestation apparatus, wherein the secret is provisioned in the memory via a trusted provisioning event by a management system corresponding to a specific use session from a plurality of use sessions of the attestation apparatus and wherein a loss of power event causes the secret to be deleted from the memory;
   at least one sensor to sense characteristics of an environment of the apparatus and generate signals indicative of the sensed environmental characteristics;
   logic, executable by the at least one processor device, in response to receiving a start of transfer request from a particular gateway device, to:
   transmit the stored secret to the particular gateway device and use a signed secret returned from the particular gateway device to generate a custody transfer message to the management system;
   generate log data from the signals and store the generated log data in the memory; and
   generate attestation data derived from the stored secret along with log data of the attestation apparatus;
   a communications interface to send the generated attestation data and the log data to the management system via the particular gateway device to verify integrity and authenticity of the attestation apparatus based on the received attestation data corresponding to said specific use session.

2. The apparatus of claim 1, wherein the secret is stored in a first portion of the memory, the memory comprises a second portion, and the second portion of the memory comprises non-volatile memory.

3. The apparatus of claim 2, wherein the memory comprises random access memory.

4. The apparatus of claim 2, wherein the second portion of the memory is to store log data to be shared with the another device.

5. The apparatus of claim 1, wherein the attestation data is to attest to integrity of the apparatus.

6. The apparatus of claim 5, wherein the integrity of the apparatus is conditioned on the apparatus having maintained power throughout a session and the secret is provisioned to correspond to a start of the session.

7. The apparatus of claim 1, wherein the attestation data is generated from a cryptographic hash of the log data using the secret.

8. The apparatus of claim 1, wherein the attestation data is to represent integrity of the log data.

9. The apparatus of claim 1, wherein the memory is provisioned with a random number and the attestation data is generated based on the random number and secret data.

10. The apparatus of claim 1, wherein the communication interface is further to receive a signal from the another device and send the attestation data to the another device in response to the signal, and the another device is to forward the attestation data to a management system over a network.

11. The apparatus of claim 1, wherein the apparatus comprises an in-package sensor device to sense conditions during a shipment of the package.

12. At least one non-transitory computer-readable storage medium having instructions stored thereon, the instructions when executed on a processor device, cause the processor device to:
receive, at an attestation device, a signal from a particular gateway device, the attestation device comprising:
an energy storage module to power the attestation device;
a memory in which a secret is stored on the attestation apparatus, wherein the secret is provisioned in the memory via a trusted provisioning event by a management system corresponding to a specific use session from a plurality of use sessions of the attestation apparatus and wherein a loss of power event causes the secret to be deleted from the memory; and
at least one sensor to sense characteristics of an environment of the apparatus and generate signals indicative of the sensed environmental characteristics;
transmit the stored secret to the particular gateway device and use a signed secret returned from the particular gateway device to generate a custody transfer message to the management system;
generate log data from the signals and store the generated log data in the memory; and
generate attestation data derived from the stored secret along with log data of the attestation apparatus;
a communications interface to send the generated attestation data and the log data to the management system via the particular gateway device to verify integrity and authenticity of the attestation apparatus based on the received attestation data corresponding to said specific use session.

13. The storage medium of claim 12, wherein the instructions, when executed, further cause the machine to configure the attestation device to load the secret in the memory segment and load a firmware image on the attestation device.

14. The storage medium of claim 13, wherein the secret and firmware image are provided by a remote management system.

15. The storage medium of claim 12, wherein the instructions, when executed, further cause the machine to participate with the particular gateway device and at least one other collocated gateway device in a custody transfer protocol.

* * * * *

UNITED STATES PATENT AND TRADEMARK OFFICE
CERTIFICATE OF CORRECTION

Page 1 of 1

PATENT NO.        : 10,044,696 B2
APPLICATION NO.   : 14/978920
DATED             : August 7, 2018
INVENTOR(S)       : Jesse Randall Walker et al.

It is certified that error appears in the above-identified patent and that said Letters Patent is hereby corrected as shown below:

In the Drawings

On sheet 9 of 10, in Figure 9, reference numeral 902, Line 1, delete "tranceiver" and insert -- transceiver --, therefor.

Signed and Sealed this
Second Day of October, 2018

Andrei Iancu
*Director of the United States Patent and Trademark Office*